United States Patent [19]
Payne et al.

[11] Patent Number: 5,647,231
[45] Date of Patent: Jul. 15, 1997

[54] APPLIANCE ELECTRONIC CONTROL SYSTEM WITH PROGRAMMABLE PARAMETERS INCLUDING PROGRAMMABLE AND RECONFIGURABLE FUZZY LOGIC CONTROLLER

[75] Inventors: Thomas Roy Payne; Steven Andrew Rice; William Waters Wead, all of Louisville, Ky.

[73] Assignee: General Electric Company, Louisville, Ky.

[21] Appl. No.: 534,002

[22] Filed: Sep. 25, 1995

Related U.S. Application Data

[62] Division of Ser. No. 421,037, Apr. 12, 1995, which is a continuation of Ser. No. 969,139, Oct. 30, 1992, abandoned.

[51] Int. Cl.$^6$ .................................................. D06F 33/02
[52] U.S. Cl. .......................................................... 68/12.01
[58] Field of Search ............................... 68/12.01, 12.02, 68/12.05; 134/57 R, 57 D

[56] References Cited

U.S. PATENT DOCUMENTS

| | | | |
|---|---|---|---|
| 4,977,394 | 12/1990 | Manson et al. | 68/12.01 X |
| 4,999,763 | 3/1991 | Ousborne | 134/57 R X |
| 5,424,940 | 6/1995 | Ousborne | 68/12.02 X |

*Primary Examiner*—Philip R. Coe
*Attorney, Agent, or Firm*—H. Neil Houser

[57] ABSTRACT

An electronic control system, particularly adaptable to coin-operated laundry appliances, which enables owners of such machines to customize machine operation. Laundry parameters are stored in random access memory, and timing functions are performed in control logic. Thus, the owner may simply update the information on a computer and download the parameters to individual laundry machines. A portable receiver/transmitter may be utilized to transfer information to the laundry machine controller by way of an infrared communications link. Also disclosed is a reconfigurable fuzzy logic control which is general purpose, having a functionality that may be easily altered in accordance with the type of machine. The structure of the fuzzy logic controller is identical for all applications. Definitions of both fuzzy logic membership functions and fuzzy logic rules are input to the controller as a set of parameters, such that the fuzzy logic controller is programmably reconfigurable without any change in the actual fuzzy logic. In the disclosed embodiment, the reconfigurable and reprogrammable fuzzy logic controller is used for two different purposes, one relating to the control of a washing machine and the other to control of a clothes dryer.

11 Claims, 27 Drawing Sheets

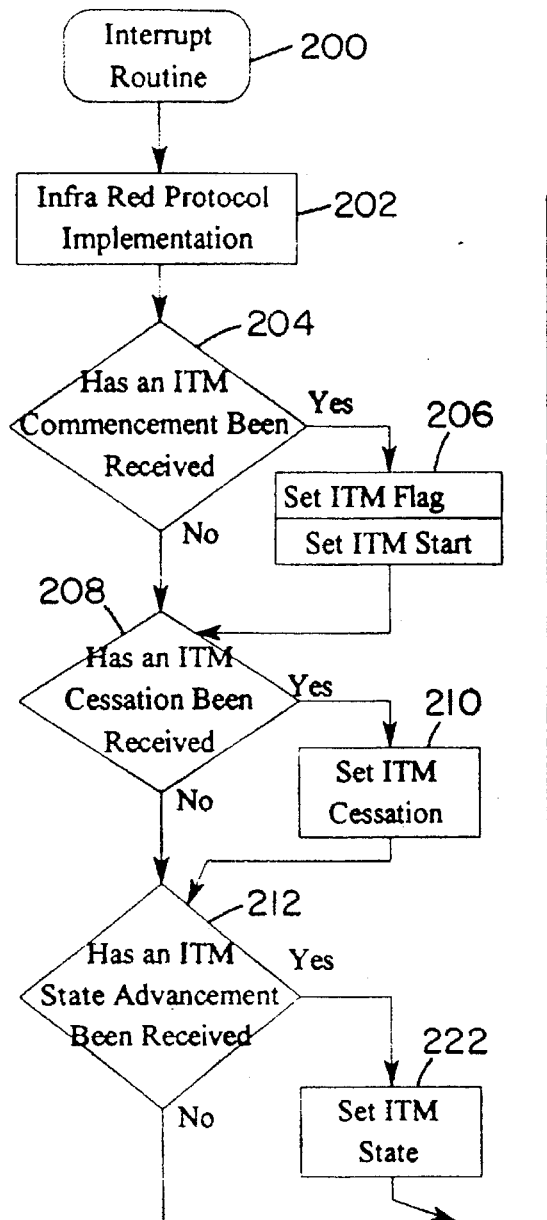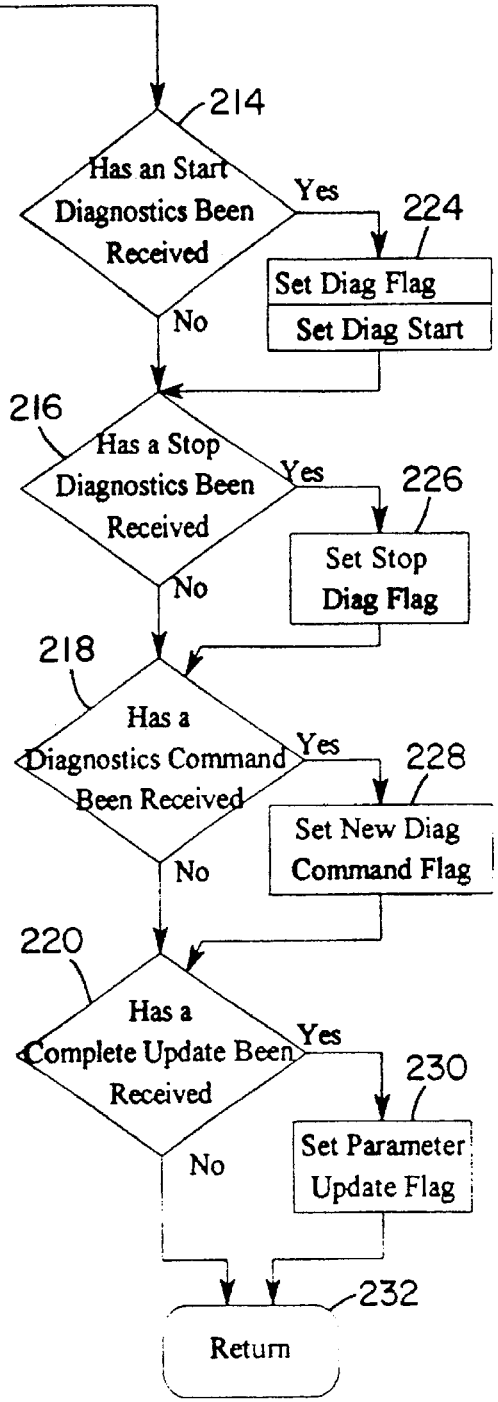
Fig. 5

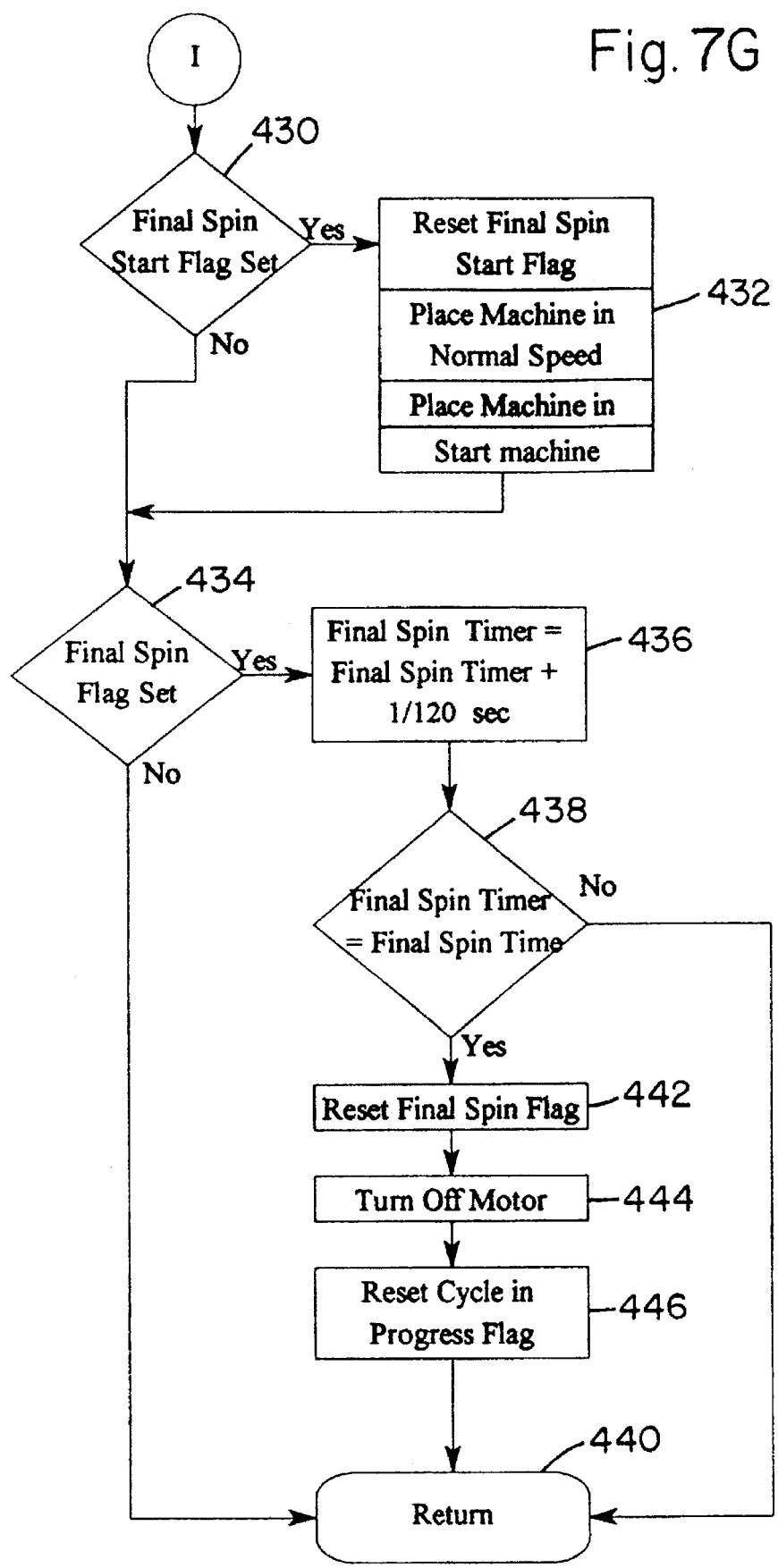

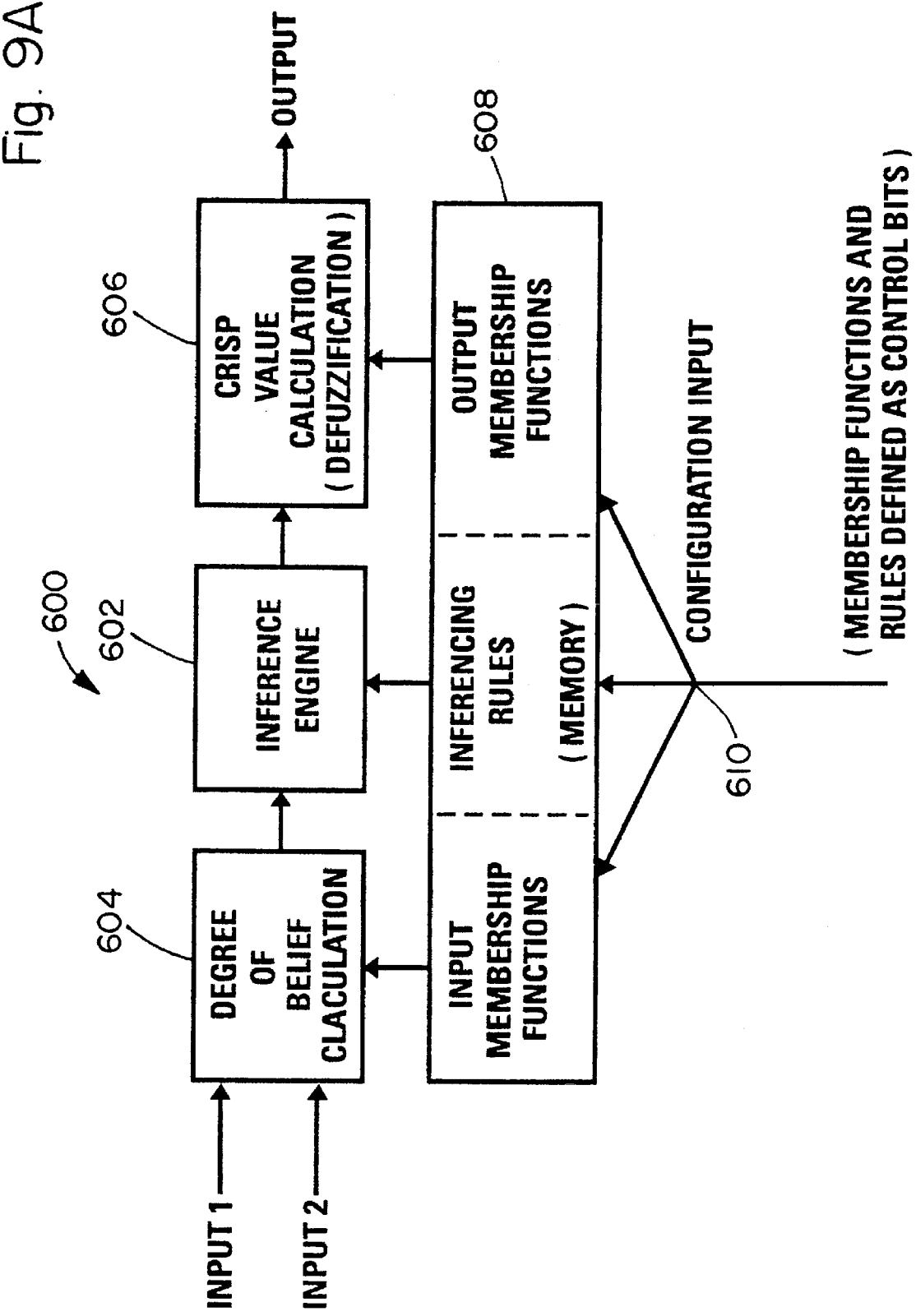

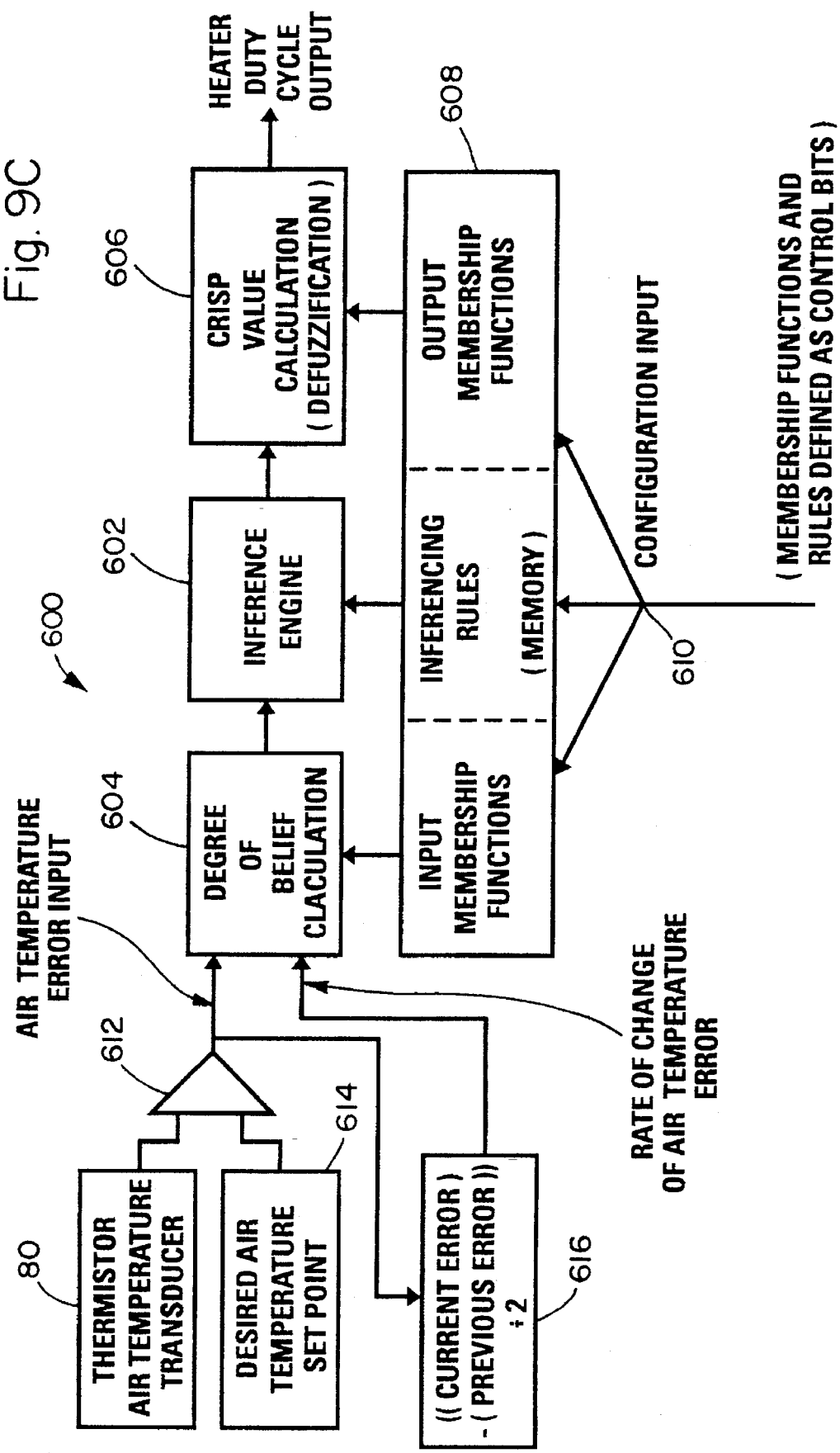

INPUT 1 MEMBERSHIP FUNCTIONS

INPUT 2 MEMBERSHIP FUNCTIONS

OUTPUT MEMBERSHIP FUNCTIONS

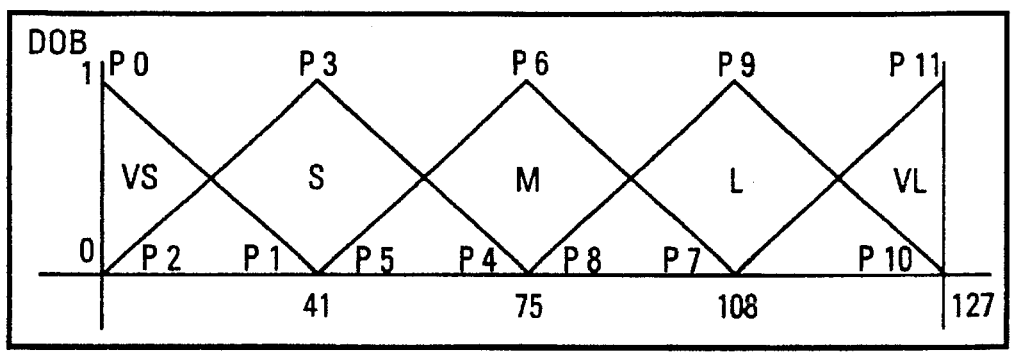
MONITOR INPUT - PRESSURE ( DIGITAL VOLTS )
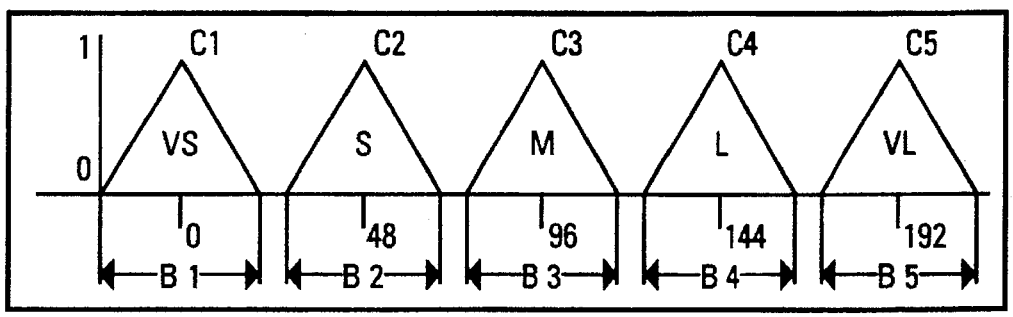
MONITOR OUTPUT - VOLUME ( GALLONS *8 )
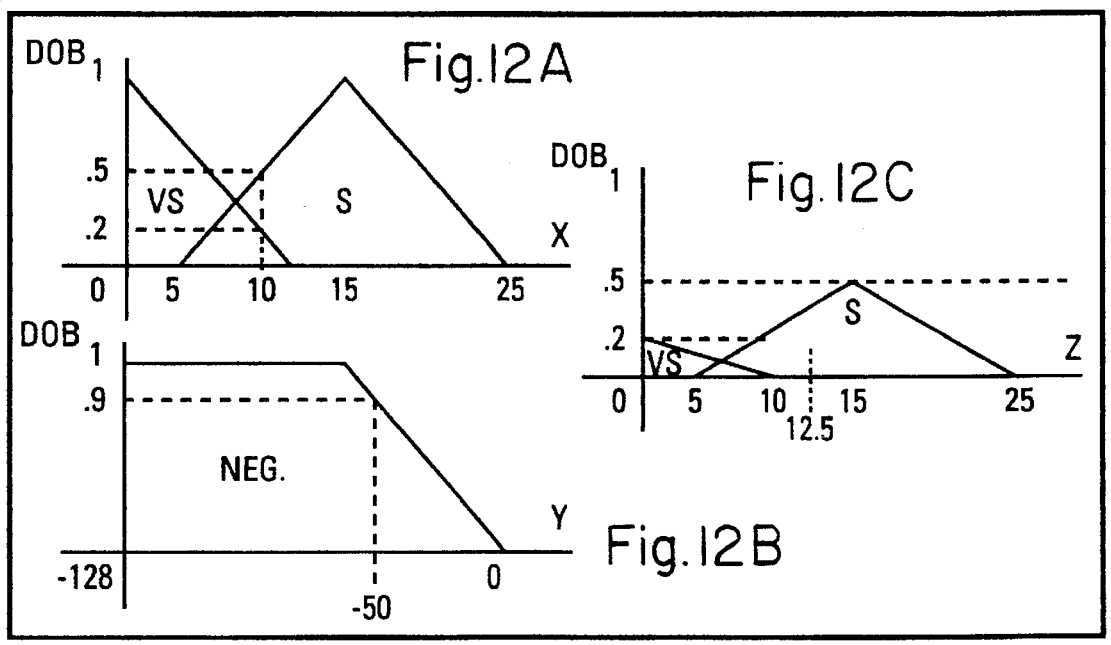
ENFERENCING EXAMPLE

INPUT - TEMP ERROR d ( INPUT ) / dt - RATE OF CHANGE OF TEMP ERROR

OUTPUT - CHANGE IN DUTY CYCLE

APPLIANCE ELECTRONIC CONTROL SYSTEM WITH PROGRAMMABLE PARAMETERS INCLUDING PROGRAMMABLE AND RECONFIGURABLE FUZZY LOGIC CONTROLLER

CROSS-REFERENCE TO RELATED APPLICATIONS

This is a division of application Ser. No. 08/421,037, filed Apr. 12, 1995, which is in turn a continuation of application Ser. No. 07/969,139, filed Oct. 30, 1992, and now abandoned.

BACKGROUND OF THE INVENTION

The present invention relates generally to electronic controllers and, more particularly, to appliance electronic controllers where various parameters, particularly parameters which relate to timing functions, can readily be programmed to accommodate machines which have different usages. In addition, the invention relates to a programmable/reconfigurable fuzzy logic controller included within an electronic controller having a functionality which is easily reconfigured according to the type of machine being controlled.

The subject invention may be implemented as a part of an appliance electronic control system which is disclosed in concurrently-filed application Ser. No. 07/968,991, filed Oct. 30, 1992, by Thomas R. Payne and Steven A. Rice, entitled "Reconfigurable Appliance Electronic Control System with Automatic Model Determination, Internally Restructurable Control and Flexible Programmable Test Modes", now U.S. Pat. No. 5,306,995, the entire disclosure of which is hereby expressly incorporated by reference.

That disclosure is directed to a microcontroller-based electronic control system which is able to handle a variety of different appliances which are members of a family of commercial laundry products. In a particular embodiment disclosed therein, a single appliance electronic control system is applicable to each of a two-speed clothes washer, a one-speed clothes washer, an electronic dryer and a gas dryer.

Current laundry appliances allow only limited selection of laundry parameters, and commercial machines typically offer only temperature selections. This situation would be entirely acceptable if all machines received similar usage. However, such is not the case, and it would be desirable to provide a laundry machine in which all laundry parameters are variable to enable the owners of such machines, particularly in commercial laundry establishments, to customize the operation of the machines to best fit the needs of the users, or to offer users a wide variety of cycles without purchasing unique machines.

Such variability can be obtained in machines with electromechanical controllers by altering the hardware responsible for the timing functions. However, in order to offer a large number of sets of laundry parameters, an unreasonably large number of mechanical timing devices would have to be produced.

As further background, a recent innovation in the field of controllers, particularly appliance controllers, is the use of what is known as fuzzy logic to make decisions and provide measurement and/or control outputs based on one or more inputs of an analog nature in accordance with a set of inferencing rules. Fuzzy logic can make "best guess" decisions in circumstances where input data is incomplete or inconsistent. Fuzzy logic controllers, as heretofore implemented, are uniquely designed for a given application.

SUMMARY OF THE INVENTION

Accordingly, it is an object of the invention to provide an appliance electronic control system which enables the owners of machines to customize operation of the machines.

It is another object of the invention to provide a reconfigurable fuzzy logic control which is general purpose, which may be used in an electronic appliance controller, or other application, and which has a functionality that is different in accordance with the type of machine it is controlling, and which can be programmed to customize operation of the machine.

In accordance with one overall aspect of the invention, flexibility in programming laundry parameters is achieved by providing an electronic control wherein laundry parameters are stored in re-programmable memory, and timing functions are performed in control logic. Thus, rather than altering an electromechanical timing mechanism, the owner simply updates the information on a computer and, for example, downloads the parameters to individual laundry machines. While there are many methods of downloading the parameters to the laundry machines, in the disclosed embodiment a portable receiver/transmitter is utilized to transfer information to the laundry machine controller by way of an infrared communications link.

As employed herein, a Laundry Parameter is either the time a laundry function may persist, or an optionally enabled feature that is not selectable from the user entry means. In developing the specific implementation disclosed herein, laundry parameters were selected from timing charts of current electromechanical laundry machines. If a particular portion of the laundry cycle was seen as critical, the parameter was defined as a timing laundry parameter. If a particular feature, such as warm rinse, was seen as optional, a flag enabling or disabling this feature was defined as an optional laundry parameter.

Since the cycles of a clothes washing machine are more complex than those of a clothes drying machine, the number of programmable laundry parameters for the clothes washing machine is greater than that of the clothes drying machine. The clothes washing machine is controlled with nine programmable laundry parameters, and the clothes drying machine is controlled with four programmable laundry parameters.

The nine programmable parameters of the washing machine are: Soak Time, Washer Time, Spin Time, Spray Rinse Delay Time, Spray Rinse Time, Rinse Time, Final Spin Time, Lid Switch Interrupt, and Warm Rinse. The first seven are timing laundry parameters and the last two are optional laundry feature parameters.

The four programmable parameters for the clothes drying machine are: Total Dry Time, Standard Cool Time, Extra Cool Time, and Dryer Variation Time. All four of these parameters are defined as timing parameters.

The cycle of the clothes washing machine commences with a fill and, once a full condition is recognized, a soak period commences. The first programmable laundry parameter, Soak Time, defines the period of time that the soak portion of the cycle persists, which may be zero for no soak at all. Upon completion of the soak, the machine begins agitating for the length of time indicated by the Washer Time. When the Washer Time expires, the clothes washing machine enters a first spin, which has a duration defined by the parameter Spin Time. During this first spin, a spray rinse may be used to dissipate sudsing left from the wash cycle. The fourth programmable parameter, Spray Rinse Delay, determines the period of time that elapses in the spin cycle before the spray rinse begins. The actual length of the spray rinse is determined by the fifth programmable laundry parameter, Spray Rinse Time. Since the spray rinse must be completed during the spin cycle, the sum of the Spray Rinse Delay and the Spray Rinse Time must be less than or equal to the Spin Time.

Upon completion of the Spin Time, the washing machine fills with water, and then begins the rinse agitation. The water temperature of the fill is determined by the Warm Rinse parameter. If the parameter is set, the machine fills with warm water; otherwise, it fills with cold water. The length of time the rinse agitation persists is defined by the parameter Rinse Time. Upon completion of the Rinse Time, the final spin is entered. The length of this final spin is determined by the Final Spin Time parameter.

During all phases of the washer cycle, with the exception of Final Spin, the Lid Switch Interrupt is either enabled or disabled according to the value of the corresponding parameter. If the Lid Switch Interrupt is enabled, all timing functions halt when the lid is opened. If the Lid Switch Interrupt is not enabled, all timing functions continue when the lid is raised. This option allows the operator to stop the timing function of the machine if the lid is raised during operation. The Lid Switch Interrupt is enabled during final spin so that a wash load is not left in the machine with no Final Spin Time left to drain the water.

The parameters of the clothes drying machine all deal with energization times for the motor and heaters. The first parameter, Total Dry Time, is simply the time that the motor that causes the tumbling action is energized. The second parameter, Standard Cool Time, is the length of time at the end of the cycle the heaters are not energized. The time the heaters are energized under standard conditions is defined as the difference between Total Dry Time and Standard Cool Time. If a permanent press option is selected, the Extra Cool Time is used for the length of time at the end of the cycle that the heaters are turned off. Under these conditions, the time the heaters are on is defined by the difference between the Total Dry Time and the Extra Cool Time.

The Dryer Variation is an option that allows the user to lengthen the clothes drying cycle by the time indicated by the parameter Dryer Variation Time. If the dryer has not entered the cool down phase at the end of the cycle, the Dryer Variation is simply added to the Total Dry Time. However, if the dryer has entered the cool down phase, the heaters will be energized for the length of time equal to the difference between the Dryer Variation Time and the selected cool down time. The net effect of this is to increase the Total Dry time by the length of the Dryer Variation Time and provide the complete selected cool down cycle at the end of the dryer cycle.

While these parameters offer an operator of commercial coin-operated laundries a great deal of flexibility, certain restrictions are applied to eliminate incorrect operation of the machine. A complete set of default parameters are programmed into the machine so that if the machine is started without being programmed, an acceptable cycle will occur. These defaults are based upon the times used for electromechanical timing mechanisms. To ensure that the machine operates within acceptable guidelines, maximums and minimums have been established when appropriate for the parameters. This action prevents the operator from inadvertently setting a parameter to a value that will provide unsatisfactory results for the user of the programmable laundry machine.

In accordance with a more particular aspect of the invention, an appliance electronic control system for controlling at least one appliance includes a controller including output lines for activating functional elements within the appliance, memory elements for storing parameters, and control elements for effecting an appliance operational cycle comprising a sequence of operational modes, the durations of at least some of the operational modes being determined based on parameters stored in memory. In addition, there is a communications link connected to the controller for receiving externally supplied parameters and inputting the parameters to the memory elements.

The control elements are also operable to store default parameters in memory for use in the event no parameters are input by way of the communications link.

Preferably, the control elements are operable to effect an operational cycle for any one of a plurality of appliances, for example a washer or a dryer, and the control elements are capable of storing in memory parameters appropriate to a particular appliance being controlled, while ignoring parameters appropriate to other appliances.

In accordance with another aspect of the invention, a reconfigurable fuzzy logic controller is provided. While the reconfigurable fuzzy logic controller of the invention is general purpose, and may be employed in a variety of applications, in the embodiment disclosed in detail herein, the reconfigurable and reprogrammable fuzzy logic controller is, by way of example, used for two different purposes. In particular, in the case of a washing machine, the fuzzy logic controller is used as a measurement device, accepting as an input a value indicating water pressure, and providing as an output a value representing a quantity of water, e.g., gallons. In the clothes dryer application, the fuzzy logic controller accepts as inputs air temperature and rate of change of air temperature, and provides as an output a signal indicating what change, if any, in heating element duty cycle is required.

As described in detail hereinbelow, implementation of a fuzzy logic controller involves membership functions and rules. It is a feature of the invention that the structure of the fuzzy logic controller is identical for all applications. It is a related feature of the invention that the same fuzzy logic controller is configured for both measurement and control applications. To implement these features, definitions of both the membership functions and the rules are input to the controller by means of a set of parameters, such that the fuzzy logic controller is programmably reconfigurable without any change in the actual fuzzy logic.

More particularly, a reconfigurable fuzzy logic controller in accordance with the invention includes at least one input for receiving an input value, an output, and a configuration input for receiving definitions of at least one set of input membership functions corresponding to the at least one input, for receiving definitions of a set of output membership functions, and for receiving a set of inferencing rules. In one embodiment, there are a pair of inputs for receiving a corresponding pair of input values. Each inferencing rule defines a particular membership function for each of the inputs and a particular output membership function. The controller includes memory elements for storing input membership function definitions, output membership function definitions, and inferencing rules received via the configuration input.

Means are provided for calculating a degree of belief for each of the stored input membership functions based on the input value, and an inference engine, operable, for each of the stored set of inferencing rules, to calculate a scaled value for a particular output membership function based on the at least one membership function degree of belief in accordance with the particular rule. Finally, the reconfigurable fuzzy logic controller includes elements for calculating a crisp value based on the calculated scaled values and for outputting the crisp value to the output.

In accordance with one aspect, the input membership function definitions are such that all input membership functions can be represented as a series of points. More particularly, each input membership function has a predetermined general shape when plotted as a function of input value, and definitions of the input membership functions comprise particular dimensions of the predetermined shapes. For example, some of the input membership functions may be triangular in shape when plotted as a function of an input value over a specified range of input values. In the case of triangular input membership functions, a maximum of three values are required to define a particular membership function. In the case of trapezoidal input membership functions, a maximum of four values are required to define a particular membership function.

Thus, a particular triangular input membership function is defined by a middle value where the input membership function has a value of one, a lower limit value where the input membership function reaches a value of zero, and an upper limit value where the input membership function reaches a value of zero.

In the disclosed embodiment of the invention, the output membership functions may be represented as triangles, and a particular output membership function is defined by a base length and centroid position.

BRIEF DESCRIPTION OF THE DRAWINGS

While the novel features of the invention are set forth with particularity in the appended claims, the invention, both as to organization and content, will be better understood and appreciated from the following detailed description, taken in conjunction with the drawings, in which:

FIG. 5 is a flowchart representing an interrupt routine to process communications received via an infrared serial communications link;

FIGS. 7A through 7G are a flowchart representing a clothes washer control routine;

FIGS. 12A, 12B and 12C graphically depict an example of fuzzy logic inferencing;

FIG. 19 is a graph of input membership functions specific to water pressure sensing for the washing machine application;

FIG. 20 is a plot of output membership functions specific to water volume in gallons specific to a washing machine;

DETAILED DESCRIPTION

Figure 1:
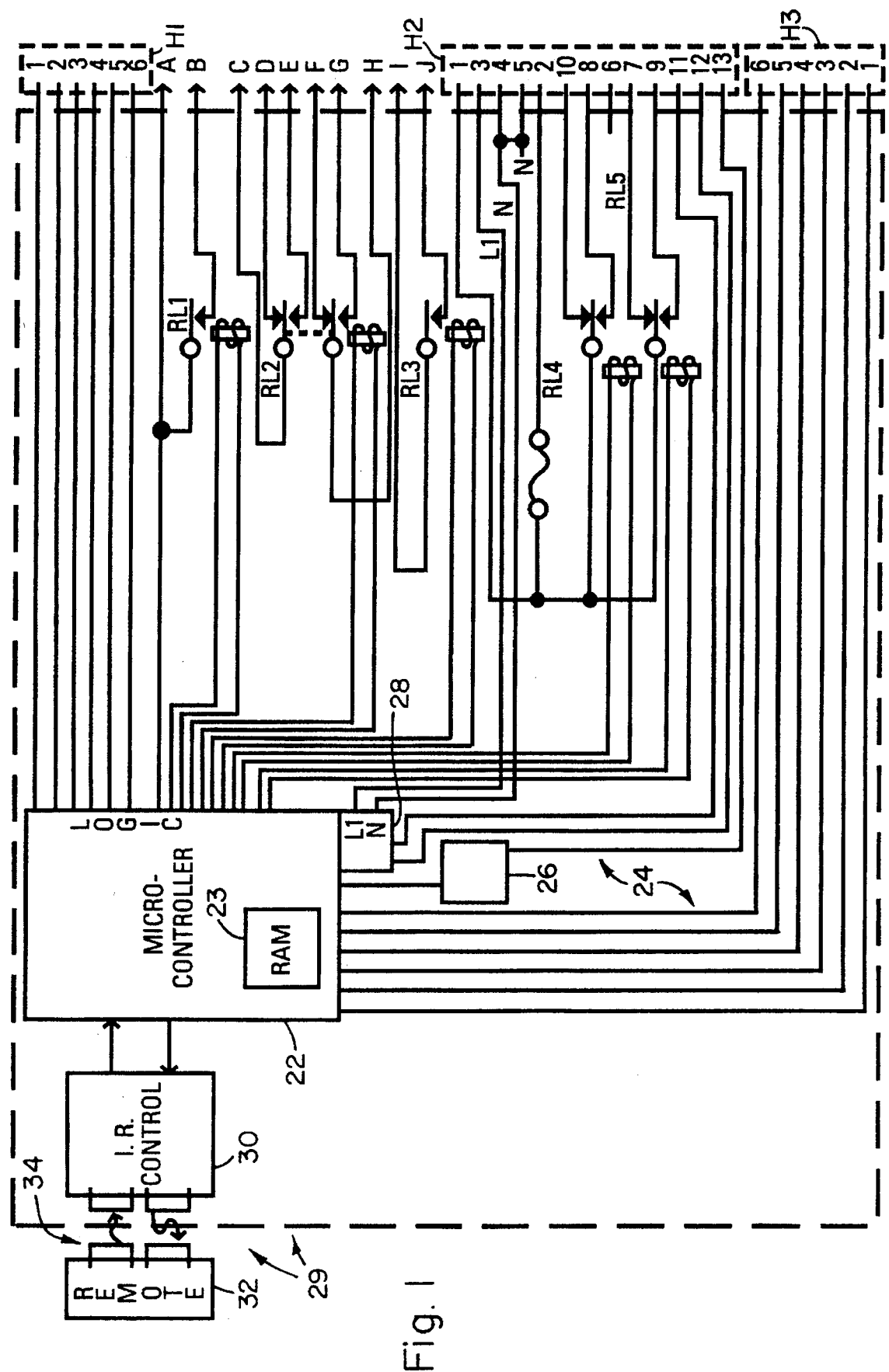
FIG. 1 is a schematic diagram of an appliance electronic control system embodying the invention, shown connected to an infrared communications link for inputting parameters.

Referring initially to FIG. 1, an appliance electronic control system 20 includes a suitably programmed microcontroller 22, for example a Motorola 6805. Within the microcontroller 22 are memory elements 23 in the form of RAM memory, as well as ROM program memory. The microcontroller 22 includes input/output port lines, generally designated 24, which output signals for activating various appliance elements, and which receive various inputs. The electronic appliance control system 20 has several connectors, including connectors designated as H1, H2 and H3, which mate with corresponding connectors that are part of the wiring harnesses of particular machines. Other connector terminals are designated "A" through "J". The microcontroller input/output lines 24 are connected to the outputs as shown in FIG. 1, in some cases directly, and in other cases through relays respectively designated RL1, RL2, RL3, RL4 and RL5.

For water level sensing in clothes washing machines and temperature sensing in dryers, the control system 20 includes an eight-bit analog-to-digital converter 26 for interfacing a water pressure sensor or a temperature sensor to the microcontroller 22. Although shown as a separate element, it will be appreciated that the analog-to-digital converter 26 may, in whole or in part, be included within the microcontroller 22.

Although not illustrated, it will be appreciated that other appropriate interface circuitry is employed in a conventional manner.

For powering the microcontroller 22 and other elements, a DC power supply 28 is included, which receives 120 volts AC from conductors L1 and N via connector H2.

A communications link 29 is provided for, among other purposes, receiving externally generated signals, for example from a hand-held receiver/transmitter 32, over the communications link 29, and for inputting various parameters to the microcontroller 24, including programmable laundry parameters and programmable fuzzy logic parameters in accordance with the invention. The communications link 29 comprises an optical infrared interface 30, which is connected to a serial communications port included as part of the 6805 microcontroller 22. The microcontroller 22 communicates via the interface 30 with a remote unit 32, for example a hand-held unit, over an optical communications channel 34. It will be appreciated that the communications link 29 may take a variety of forms, including a wired communications link. The optical infrared wireless communications link 29 is particularly convenient, however.

A suitable error-checking communications protocol is employed, appropriately programmed into both the remote unit 32 and the microcontroller 22.

Although not directly relevant to the present invention, it may be noted that two-way communication between the remote control unit 32 and the appliance electronic control system 20 serves a variety of other purposes, such as facilitating monitoring of the operational history of a particular machine, including the amount of money collected by a coin-operated commercial laundry machine. Thus, the remote unit 32 is a part of an auditing system which may be employed by an operator of commercial laundry establishments to monitor revenues generated by each machine.

Figure 2:
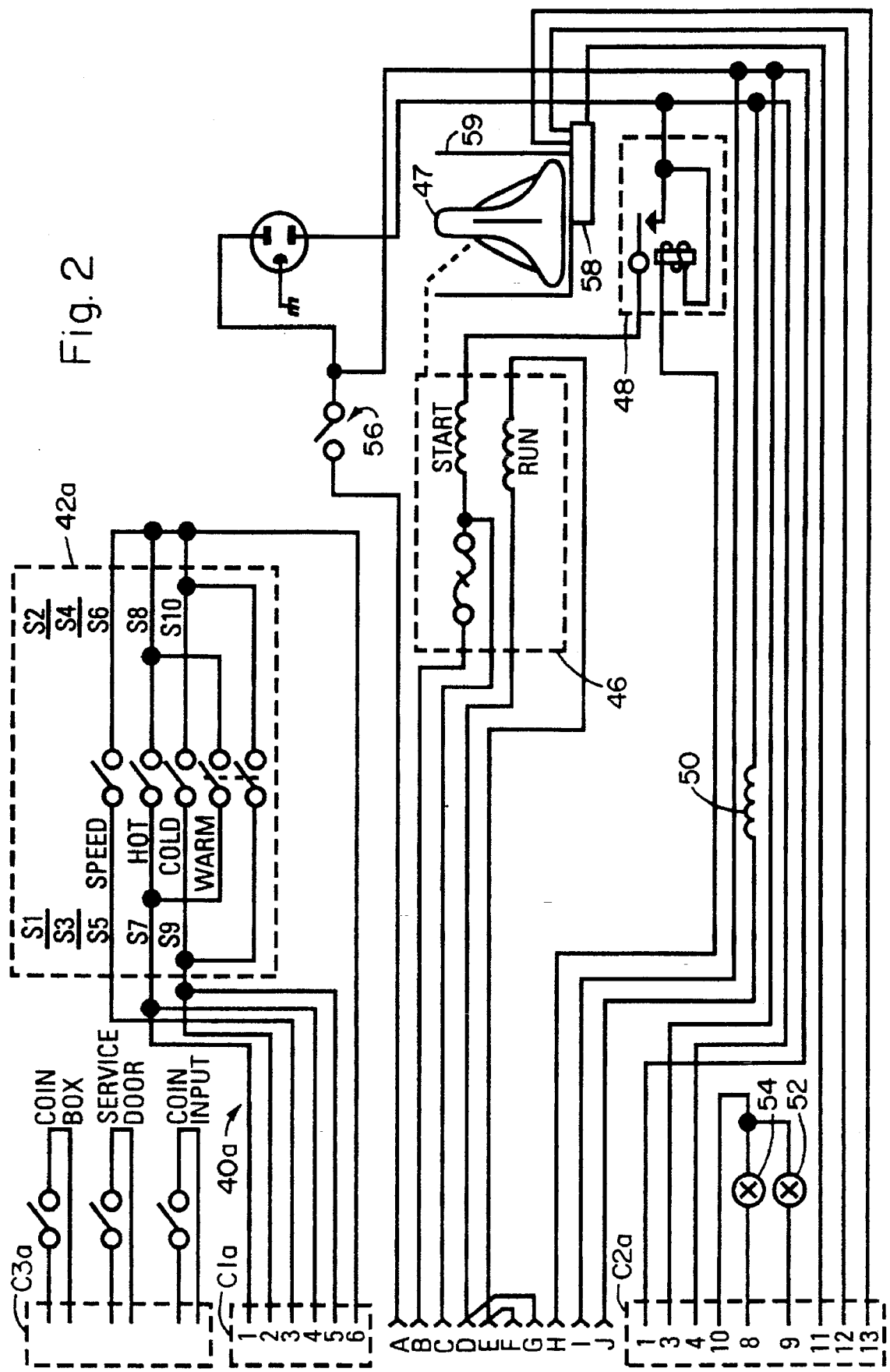
FIG. 2 is an electrical schematic diagram of a portion of the electrical circuit of a two-speed washer.
Figure 3:
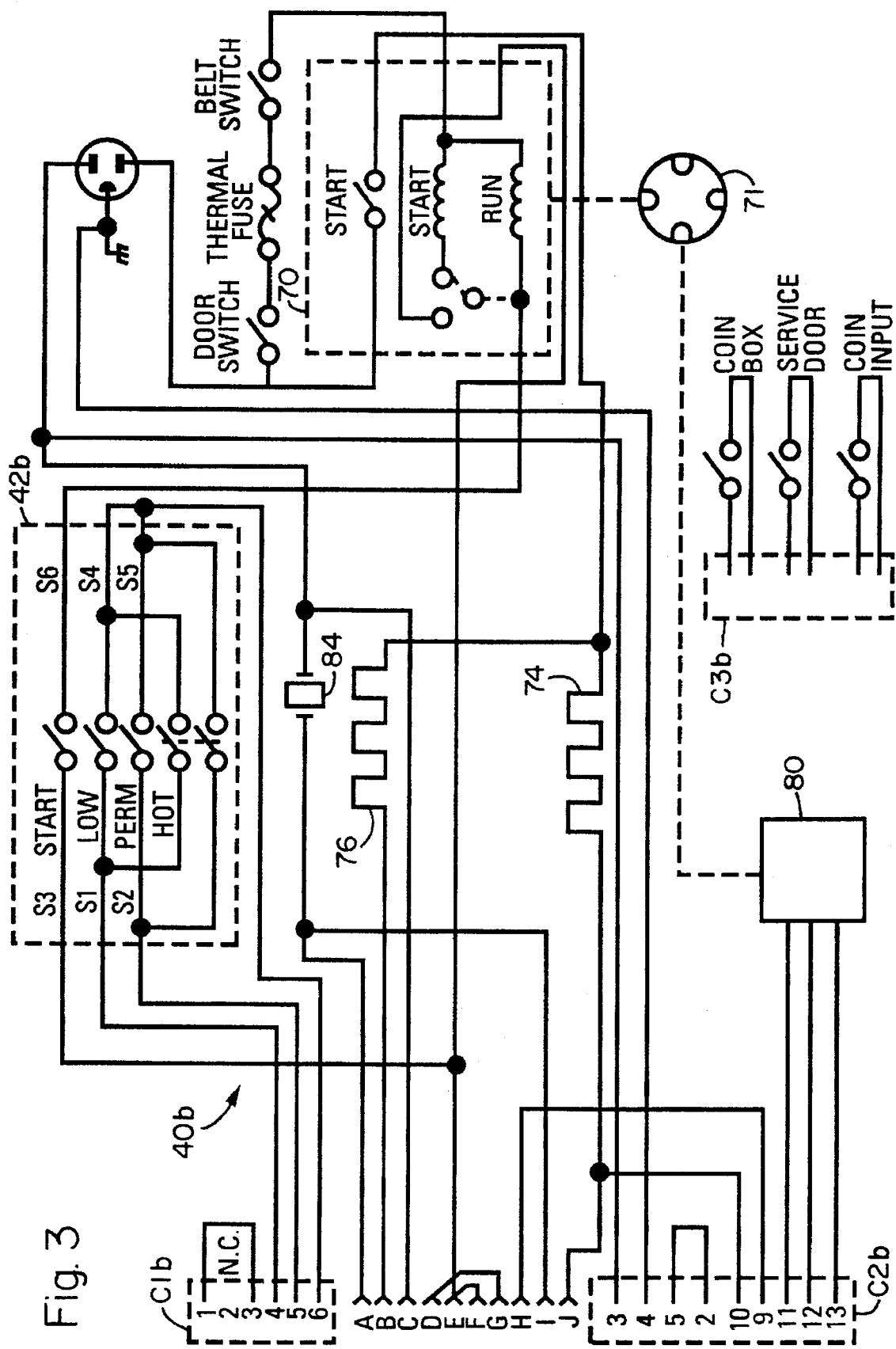
FIG. 3 is an electrical schematic diagram of a portion of the electrical circuit of an electric dryer.

By way of example, FIGS. 2 and 3 are respective electrical schematic diagrams for two representative appliances, the diagrams including wiring harnesses and functional elements. FIG. 2 is a schematic diagram for a two-speed washer, and FIG. 3 is an electrical schematic diagram for an electric dryer.

The appliances include respective wiring harnesses 40a, 40b and respective connector sets C1a, C1b; C2a, C2b; and C3a, C3b, which mate with the FIG. 1 wiring harness connectors H1, H2 and H3, respectively. The connectors for each of the appliances are identical but, as indicated, the particular connections differ.

A user selector switch 42a or 42b is connected to the control system 20 through the connector C1a or C1b. In FIG. 2, the selector switch 42a for a two-speed washer selects speed and water temperature as hot, cold or warm. In FIG. 3, the selector switch 42b for an electric dryer includes a start push button and selector switches for drying temperature and cycle selection in the form of low, permanent press and hot.

Functional elements within the washing machines include a motor 46 connected through a conventional mechanical transmission (not shown) to drive an agitator 47. The motor 46 reverses direction to effect either a spin or an agitate operation, in cooperation with the mechanical transmission (not shown). The motor 46 is initially energized through a start relay 48, which in turn is activated by a suitable signal from the controller 20. The two-speed washer of FIG. 2 additionally includes a speed selector winding 50. Other functional elements of the clothes washers of FIG. 2 are a cold water valve solenoid 52 and a hot water valve solenoid 54.

So that the controller 20 can monitor the status of the machine, the washer of FIG. 2 additionally includes a lid switch 56 and a solid state pressure sensor 58 arranged to measure water pressure exerted on the bottom of the washing machine tub 59. A suitable pressure sensor is one selected from the Micro Switch 26 PC Series, which contains four piezoresistors inside a silicon diaphragm. The diaphragm flexes with the application of a force upon the diaphragm, and the piezoresistors change depending upon the amount of flex in the diaphragm. A full bridge arrangement connects the piezoresistors so that the output voltage is proportional to the input voltage and the amount of diaphragm flex (input pressure). For a 1 psi sensor the full scale output is 23 mV. A differential amplifier (not shown) produces a 0–2.5 V output for a 0–18 Inch $H_2O$ input. The analog to digital converter 26 has its high reference set to 2.5 volts and its low reference set to ground to convert the amplified voltage into a digital number for further calculations. After the microcontroller 22 reads the digital number, the pressure reading is ready for filtering and preprocessing. The filtered pressure reading is then fed into the programmable fuzzy controller as an Input.

In the event fuzzy logic control is not employed, a conventional water level sensor may be employed.

Since these are coin-operated appliances, a connector C3a or C3b is provided for connection to a conventional coin box or a coin slide mechanism.

The electric dryer of FIG. 3 likewise includes a motor 70 for rotating a clothes drying drum 71. Also included is a low electric heating element 74 and a high electric heating element 76.

An analog temperature sensor 80 is provided to sense temperature within the clothes drying drum 71. Various other sensors and switches are included as indicated, all in accordance with conventional practice.

From FIGS. 1–3, it can be seen that relay RL1 controls energization of the motor 46 of the washing machines of FIG. 2, and activates high heat in the electric dryers of FIG. 3. In the electric dryer of FIG. 3, relay RL1 when activated completes a circuit through the high heater 76. Relay RL2 controls motor direction (agitate or spin) in the washing machine of FIG. 2, and controls energization of the motor 70 of the dryer of FIG. 3. Relay RL3 controls motor speed in the two-speed washer of FIG. 2, and activates low heat in the dryer of FIG. 3. In the electric dryer of FIG. 3, relay RL3 when activated completes a circuit through the low heater 74. Relay RL4 controls energization of the hot water solenoid 54 in the washer of FIG. 2, and is unused in the case of the dryer of FIG. 3. Similarly, relay RL5 controls energization of the cold water solenoid 56 in the washer of FIG. 2, and is unused in the case of the dryer of FIG. 3.

Controller Overview

Figure 4:
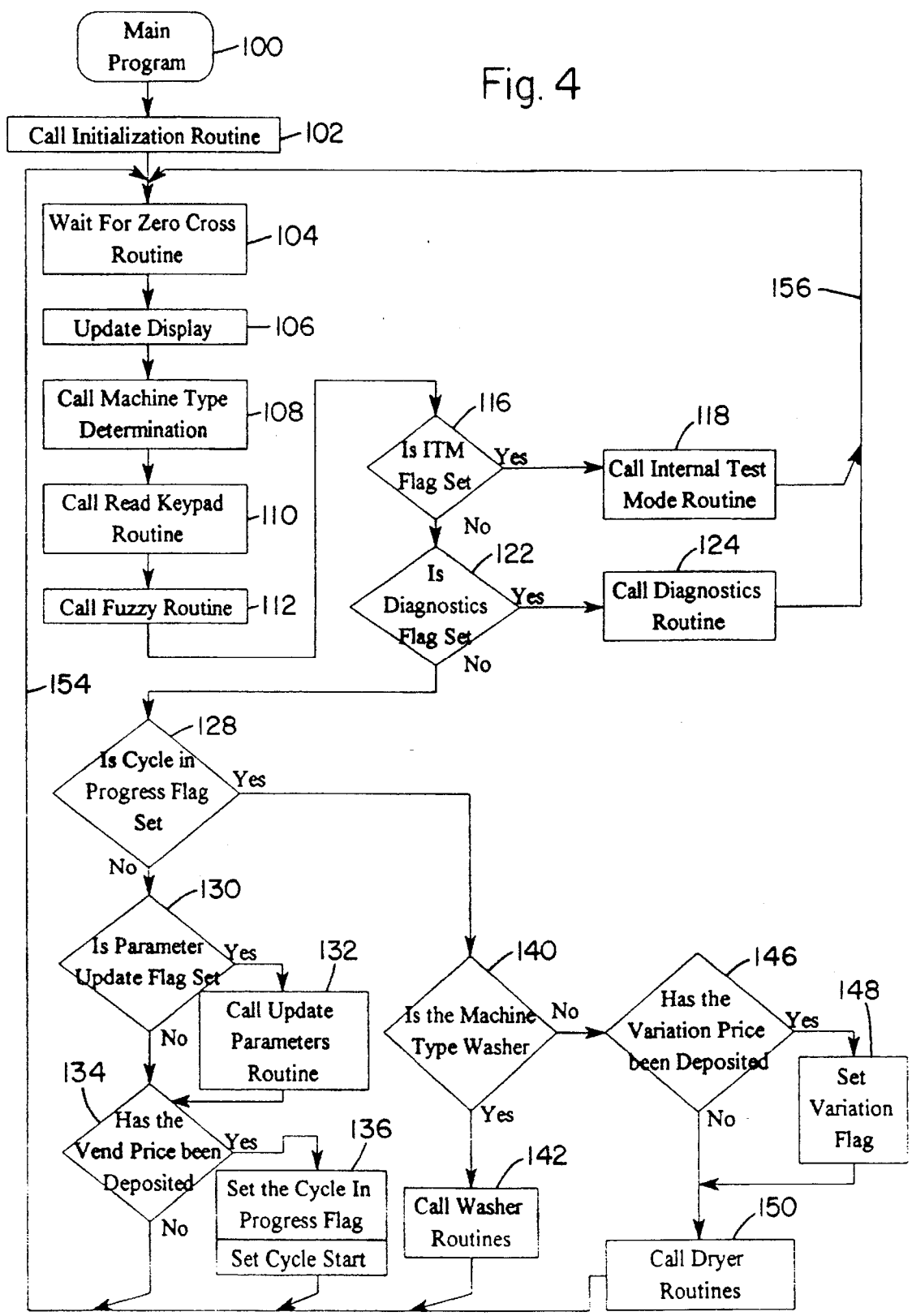
FIG. 4 is a flowchart representing the top level of a main control program.

Considering now exemplary programming within the microcontroller 22, FIG. 4 is a flowchart showing the overall structure of a control program, identified as Main Program 100; and FIG. 5 is a flowchart of an Interrupt Routine 200 which services the FIG. 2 infrared control interface 30. The hardware is such that an interrupt is generated each time a data byte is received from the remote unit 32 over the communications channel 34. The FIG. 5 interrupt service routine communicates with the FIG. 4 main program by setting various flags in memory, which are tested at various points during execution of the FIG. 4 main program. The FIG. 4 main control program and the FIG. 5 interrupt service routine proceed more or less independently, communicating with each other through the various flags set in memory. In essence, the microcontroller 24 is running two programs.

The Main Program of FIG. 4 is entered in Box 100. Execution proceeds to Box 102, where an Initialization Routine is called to initialize the microcontroller 22 system in a conventional manner.

Thereafter, a program main loop is entered which begins with a Zero Cross Routine in Box 104. The program waits in the Box 104 Zero Cross Routine until a zero crossing of the AC power line is detected. (With a 60 AC power line frequency, zero crossings occur one hundred twenty times per second.) The entire program main loop, including called routines as described hereinbelow, executes in less than 1/120 second, whereupon execution returns to Box 104 to wait for the next zero crossing.

When a zero crossing is detected, an Update Display Routine is called in Box 106, which updates an associated user display (not shown) to indicate the status of the machine, in a manner not particularly relevant to the present invention.

Next, in Box 108, a Machine Type Determination routine is called, described in detail in the above-incorporated concurrently-filed application Ser. No. [9D-HL-18278]. The Machine Type Determination routine logically determines the particular appliance by causing signals to be applied to particular ones of the terminals of the wiring harness connector H1, and thus C1a or C1b, in a predetermined pattern, while monitoring others of the terminals to logically recognize a wiring harness indicating a particular appliance. In accordance with the particular organization of the Main Program flow chart of FIG. 4, the Machine Type Determination routine is executed one hundred twenty times per second, even though the particular appliance does not change, and sets an appropriate software flag indicating the particular appliance each time it is executed.

The FIG. 4 Main Program then continues in Box 110 with a call to a Read Keypad routine, also described in Ser. No. [9D-HL-18278], where the microcontroller 22 determines the state of the selector switch 42a or 42b in order to determine the user's selections.

The FIG. 4 Main Program then continues with block 112 which calls a Fuzzy System routine 114 described hereinbelow with reference to FIG. 18.

Next, in decision Box 116, an Internal Test Mode (ITM) flag is tested to see whether execution should pass to Box 118 which calls an Internal Test Mode routine described in detail in the above-incorporated application Ser. No. [9D-HL-18278]. The ITM Flag is set or not by the FIG. 5 interrupt service routine based on commands received from the remote unit 32 over the infrared communication channel 34.

If the answer in decision Box 116 is "no", then in decision Box 122 a Diagnostics Flag is tested and, if set, execution proceeds to Box 124 where a Diagnostics routine is called, as is also described in detail in the above-incorporated application Ser. No. [9D-HL-18278]. The Diagnostics Flag likewise is set or not: by the FIG. 5 interrupt service routine upon command from the remote unit 32.

If the Diagnostics Flag is not set, then execution proceeds to decision Box 128 where a Cycle In Progress Flag is tested. One of the purposes of testing the Cycle In Progress Flag in Box 128 is to ensure that parameters are not updated during a machine cycle. The Cycle In Progress Flag is initially clear so that, at least the first time the FIG. 4 main program is executed, execution passes to decision Box 130 where a Parameter Update Flag is tested and, if set, execution proceeds to Box 132 which calls an Update Parameters routine described hereinbelow with reference to FIG. 6. The Parameter Update Flag is another flag which is set or not by the FIG. 5 interrupt service routine based on instructions received over the communications channel 34.

In decision Box 134 the state of an appropriate line of the FIG. 1 connector H3 is tested to determine whether the appropriate amount of money has been deposited. If not, execution loops back to the Zero Cross Routine 104. If the price has been deposited, then execution proceeds to Box 136 where the Cycle in Progress Flag is set, to be subsequently tested in decision Box 128 the next time the FIG. 4 routine is executed, and a Cycle Start flag is set.

Thus, upon the next zero crossing, program execution proceeds from Box 104 through procedures and tests as described above, to decision Box 128, where the Cycle In Progress Flag is found to be set. At this point, decision Box 140 is entered which tests a flag from the Machine Type Determination routine to see whether the machine type is a washer. If the answer is yes, then execution proceeds to Box 142 which calls a Washer Routine 144, represented by the flowcharts of FIGS. 7A through 7G.

Figure 8A:
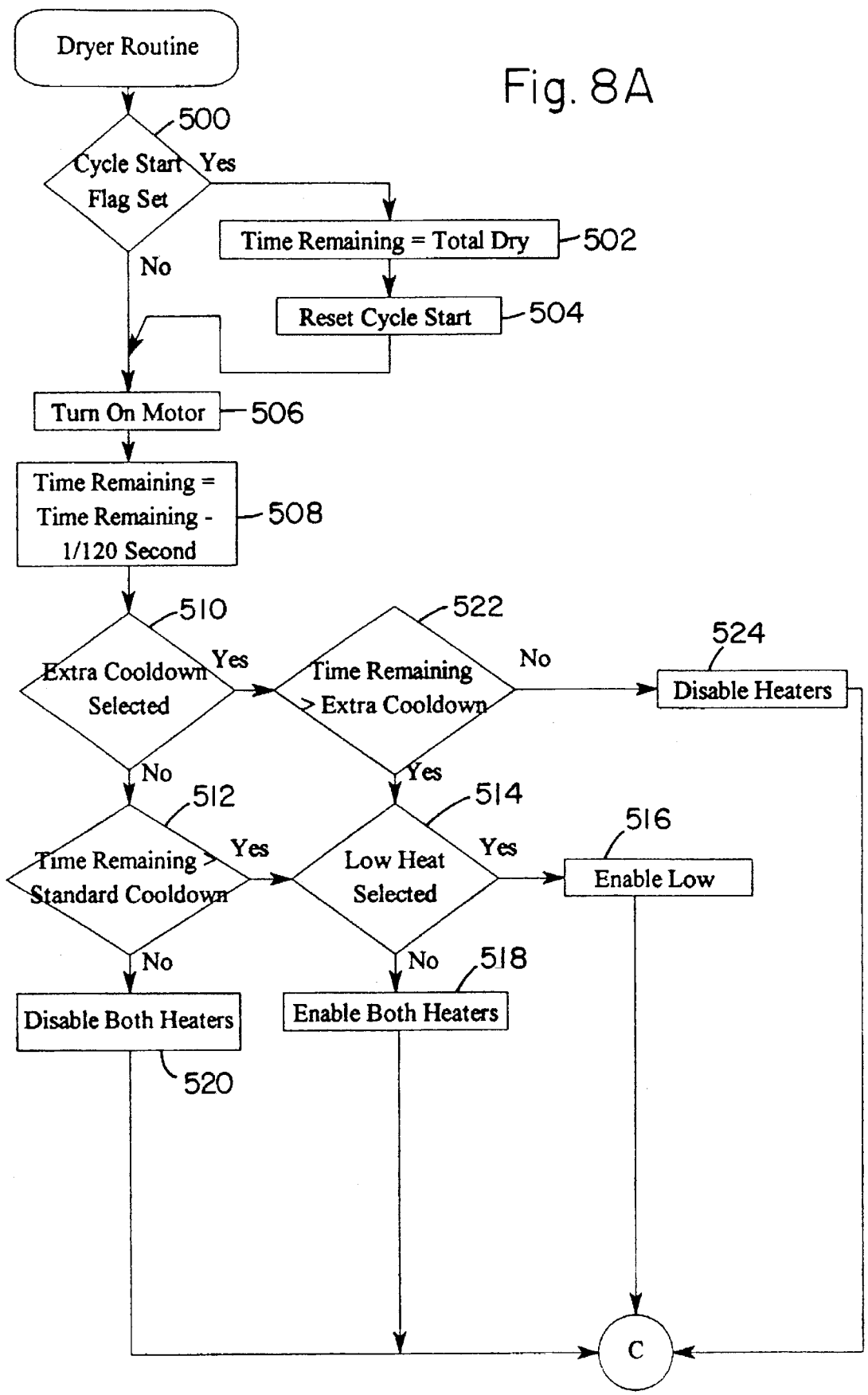
FIGS. 8A and 8B are a flowchart representing a clothes dryer control routine.
Figure 8B:
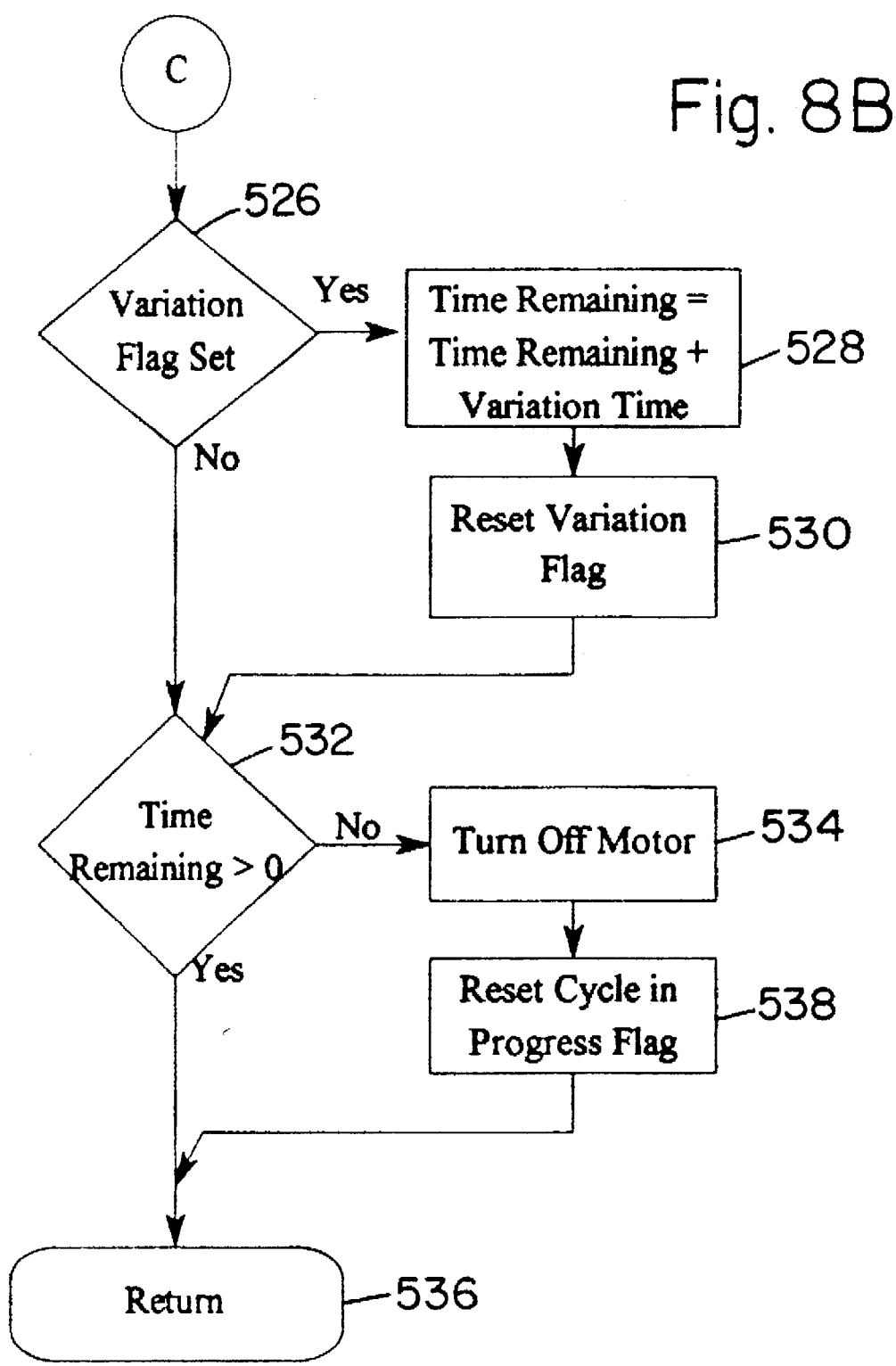

If the answer in decision Box 140 is no, then it is assumed the machine is a dryer, and decision Box 146 is entered which checks to see whether the user has, within the last 1/120 second, inserted an additional coin for an additional dryer time, known as variation price, and, if so, in Box 148 a Variation Flag is set. In either event, execution then proceeds in Box 150, where a Dryer Routine 152, represented by the flowcharts of FIGS. 8A and 8B, is called.

Again, the entire set of routines executed quickly, in less than 1/120 of a second, and the Main Program loops via flowchart path 154 or 156 back to the Zero Cross Routine of Box 104 to wait for the next zero crossing of the AC power line.

Referring now to FIG. 5, the interrupt service routine is designated Interrupt Routine 200, and is responsible for receiving information from the FIG. 1 remote unit 32 via the infrared communications channel 34 and the control interface 30. When a data byte has been received, the interface 30 asserts a processor interrupt, whereupon the Interrupt Routine 200 is entered.

In Box 202 a suitable protocol is implemented in a conventional manner to assemble sequences of data and ensure that valid data bytes are being communicated. By way of example, data bytes may be transmitted over the communications channel 34 employing an asychronous transmission mode at a 9600 baud rate, with the following character format: 1 start bit, 8 information bits, 1 stop bit, no parity. Each command contains an entire block of data that begins with "stx" and ends with "etx". The data block contains an integral number of bytes, and a crc-16 error check is employed.

In decision Box 204, data received from the communications channel 34 and processed in Box 202 is examined to see whether a command to commence the Internal Test Mode has been received. If the answer is yes, then in Box 206 an ITM Flag and an ITM Start Flag are set.

Similarly, in decision Box 208, data from the communications channel 34 is examined to determine whether a command to cease the internal test mode has been received and, if so, in Box 210 an ITM Cessation Flag is set.

Execution proceeds as indicated in the FIG. 5 flowchart through a series decision Boxes 212, 214, 216, 218 and 220 in which data from the communications channel 34 is examined to determine whether various flags should be set or not, as indicated in respective Boxes 222, 224, 226, 228 and 230. Finally, a Return from the FIG. 5 Interrupt Routine 200 is executed in Box 232.

Programmable Laundry Parameters

It is a feature of the invention that an owner of a plurality of laundry appliances, including both washers and dryers of various models, can generate a single set of parameters for all machines, and a particular appliance controller accepts and stores only appropriate data for the particular machine, and ignores the rest. Thus, the operator can in a simple manner program his complete fleet of laundry machines with one data stream, and not have to be concerned about which appliance is supposed to get which data.

Figure 6:
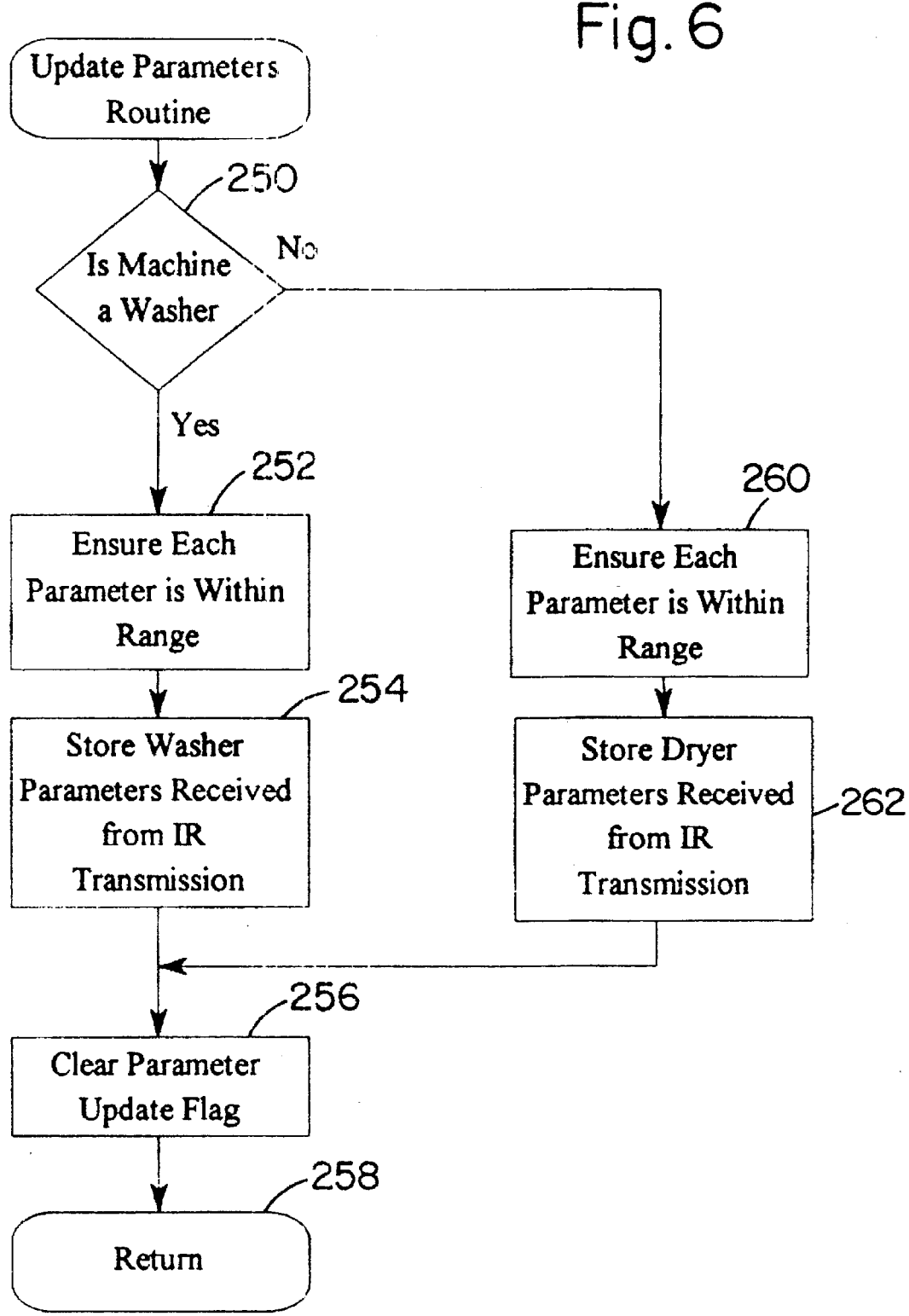
FIG. 6 is a flowchart representing an update parameters routine.
Figure 7A:
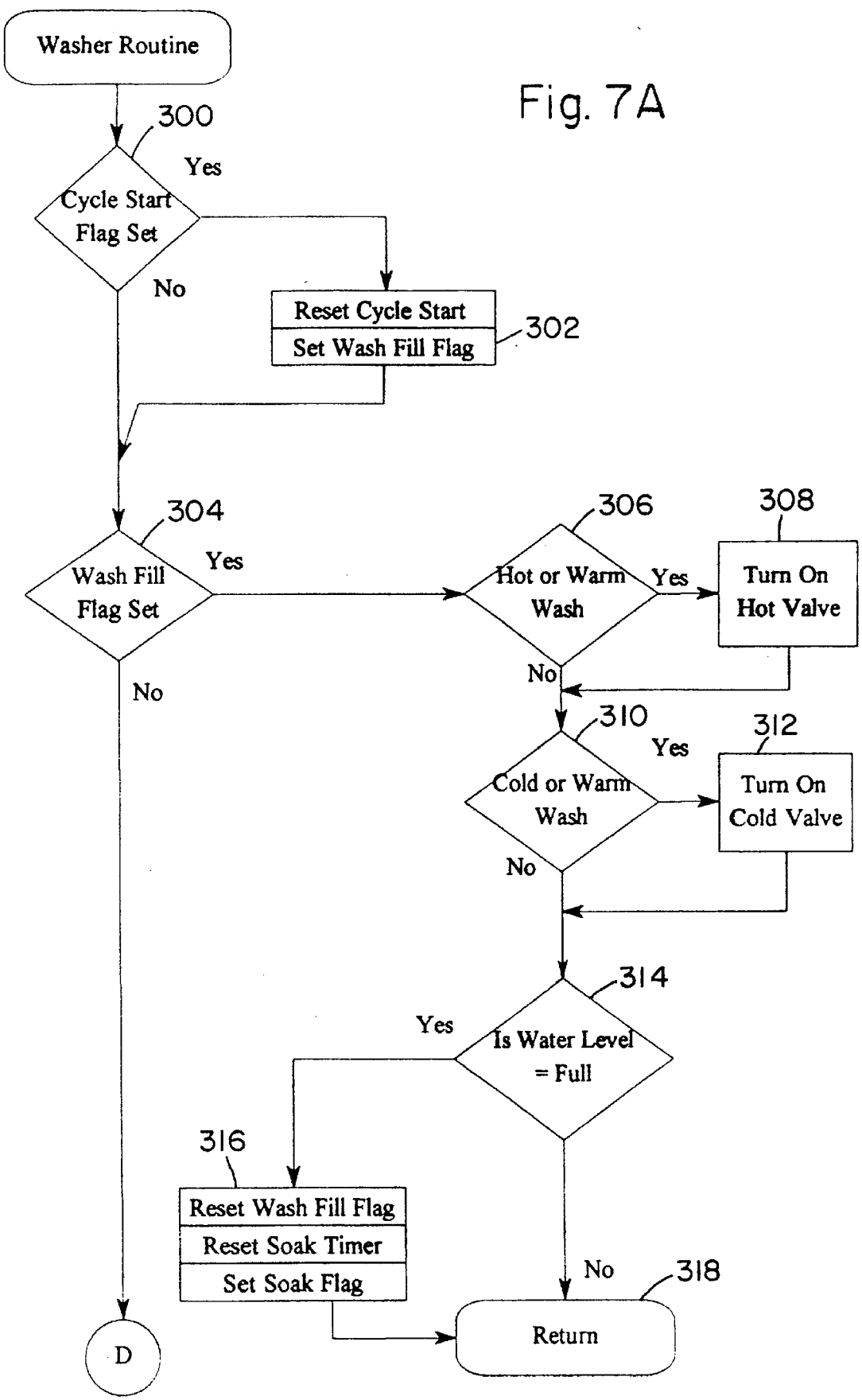
Figure 7B:
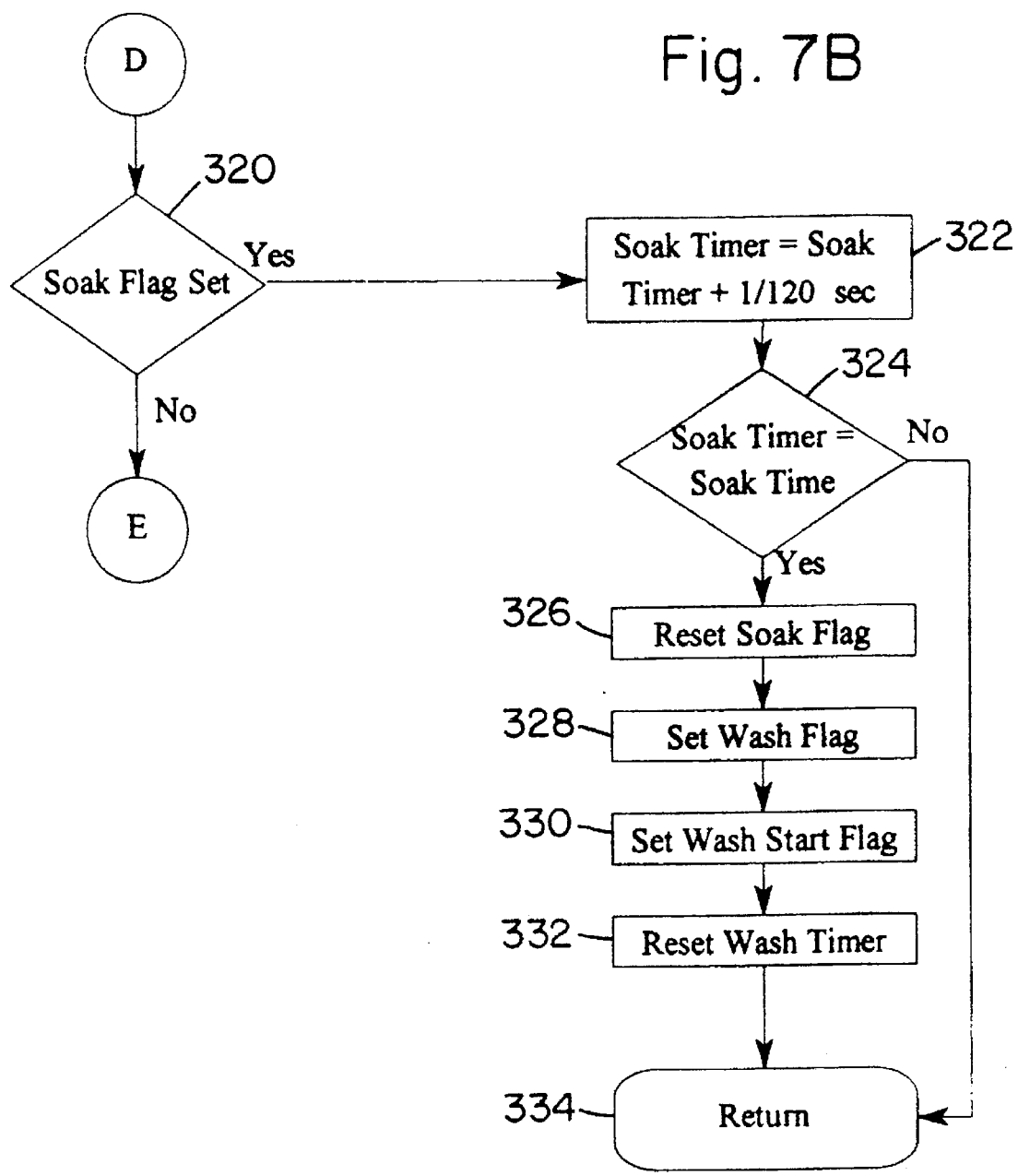
Figure 7C:
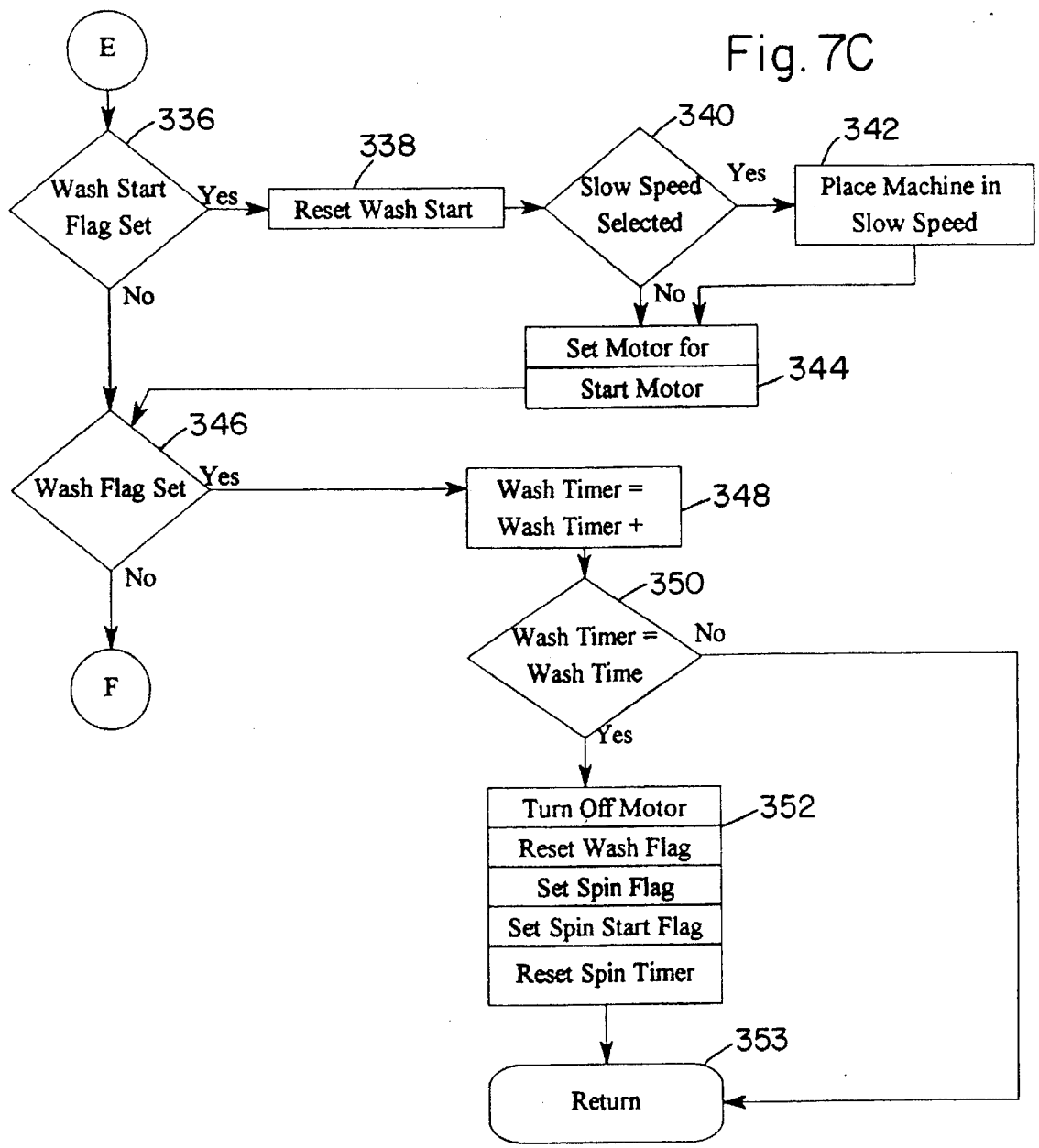
Figure 7D:
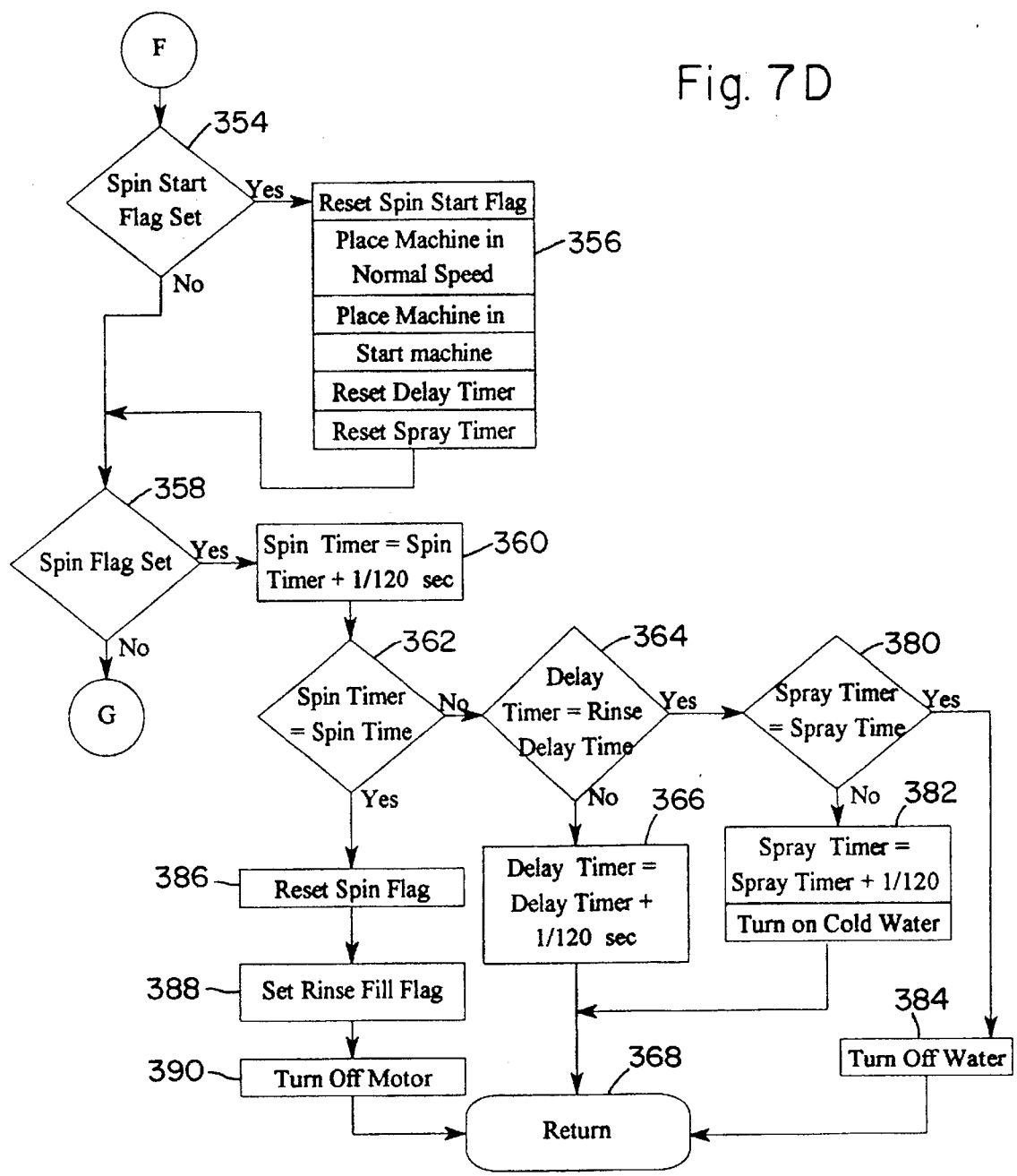
Figure 7E:
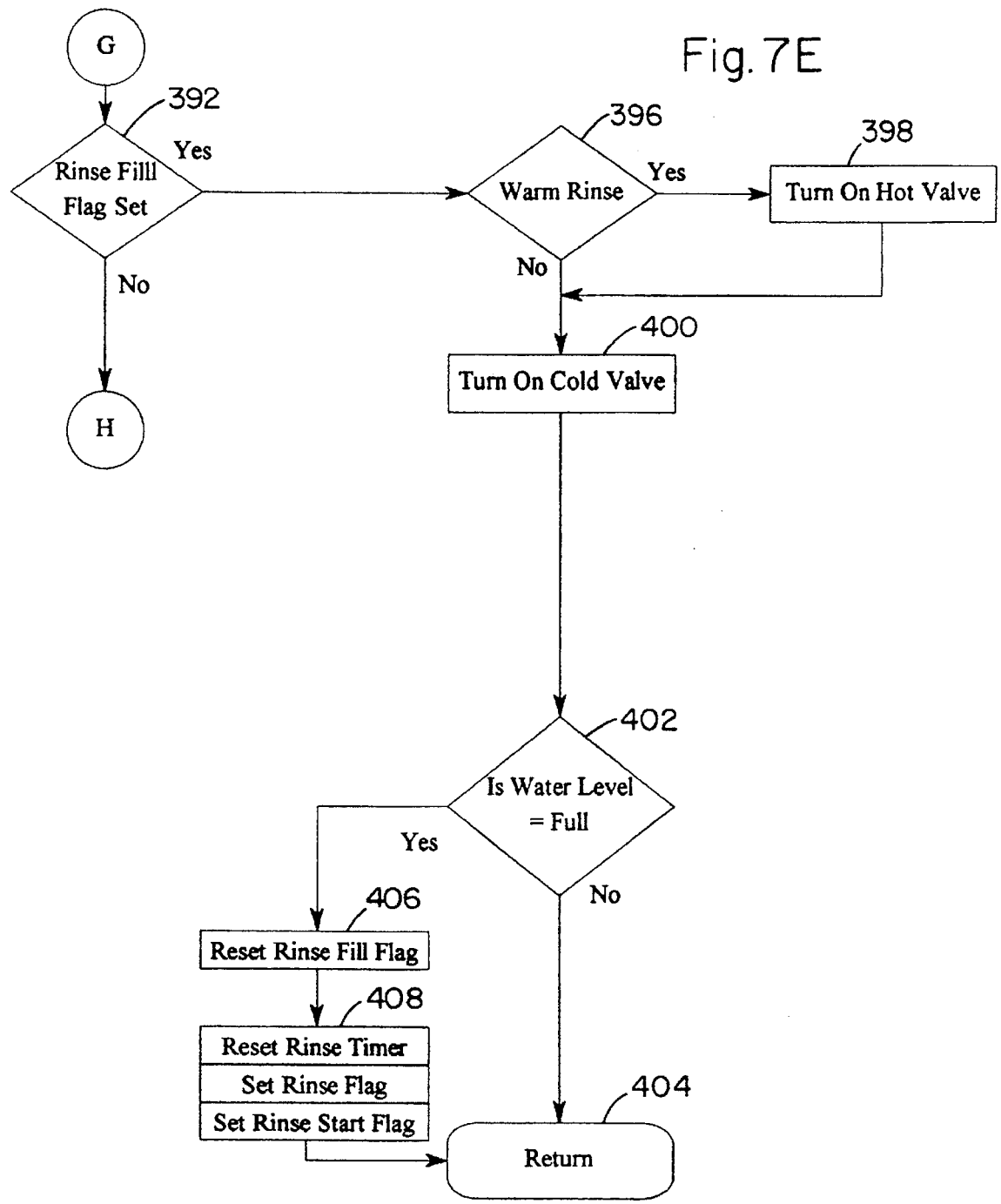
Figure 7F:
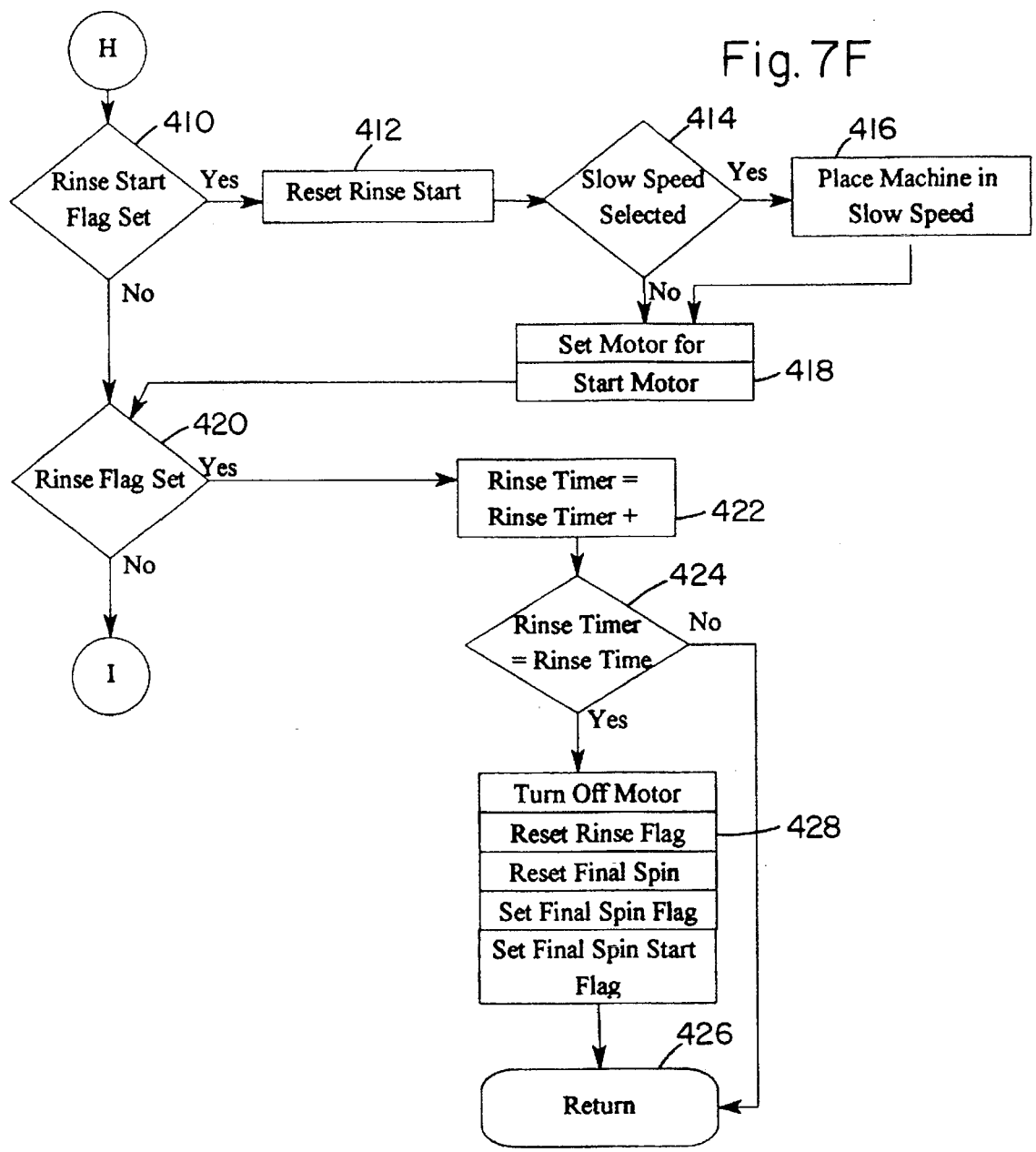

Thus, the FIG. 6 update parameters routine is called by FIG. 4 Box 132 when FIG. 4 decision Box 130 has determined that the Parameter Update flag is set. The FIG. 6 routine begins with a decision Box 250, which determines whether the machine is a washer or a dryer, based on the machine type as determined by the Machine Type Determination routine called from Box 108 of the FIG. 4 flowchart.

In the event the machine is a washer, in Box 252 each parameter is compared against an allowable minimum and an allowable maximum to ensure the parameters being programmed are within an acceptable range. Any attempted parameter programming which is outside the established range, is set to the allowable minimum or maximum.

Next, in Box 254, the washer parameters are stored in appropriate locations in processor memory. The parameter update flag is then cleared in Box 256, and the routine exits at 258.

In the case of a dryer, following decision Box 250, execution proceeds to Box 260 where the parameters are similarly compared against allowable minimums and maximums, and then stored in memory in Box 262.

Again, the parameter update flag is cleared in Box 256, and the routine exits at 258.

As an example, in a parameter update mode, a communications dialogue between the remote unit 32 and the controller 20 over the communications channel 34 proceeds as follows:

| | |
|---|---|
| Remote: | stx, "A", <soak time>, <wash time>, <spin time>, <spray rinse delay>, <spray rinse time>, <rinse time>, <final spin time>, <washer flags>, etx, crc. |
| Controller: | ack<br>or<br>nak<br>In case of nak, the remote sends the request again.<br>The remote makes two attempts at transmitting the data. If the Remote is unsuccessful at transmitting the data after two attempts, the controller displays a transmission failure message.<br>If the controller issues a nak as a result of a CRC failure, and does not begin receiving a transmission within 128 milliseconds, the controller continues normal operation and displays an error message.<br>If the controller does not receive a transmission within 512 milliseconds, the controller continues normal opertion and displays an error message. |
| Remote: | stx, "B", <total dry time>, <standard cool time>, <extra cool time>, <dryer variation time>, etx, crc. |
| Controller: | ack<br>or<br>nak<br>Action in the case of "nak" or transmission failure same as above. |
| Remote: | EOT<br>If the controller receives a valid transmission, the updated parameters are saved, and the controller displays a confirmation message. Data is considered valid only if all data has been successfully transmitted. For example, if the first block of data is valid and a "nak" is received for the second block of data, then all the data is considered invalid, and none of the data is stored. During re-transmission, if a "nak" is received for one block of data, data transmission will begin with the block of data that was invalid. If an update occurred during a machine cycle, the new parameters take effect upon completion of the current cycle. If the controller is idle during the update, the parameters take effect immediately. |

The following TABLE I summarizes the programmed laundry parameters, the default parameters utilized if no parameters have been otherwise programmed, and the allowable minimum and maximum for each parameter. It will be appreciated that the parameters in TABLE I below are in addition to the separate fuzzy logic controller parameters, described in greater detail hereinbelow with reference to FIGS. 9 through 23.

TABLE I

| PARAMETER | DEFAULT | MINIMUM | MAXIMUM |
|---|---|---|---|
| SOAK TIME | 0 MIN. | 0 MIN. | 4 MIN. |
| WASHER TIME | 11.75 MIN. | 8.5 MIN. | 15 MIN. |
| SPIN TIME | 3.5 MIN. | 3.0 MIN. | 4 MIN. |
| SPRAY RINSE DELAY | 1.75 MIN. | 1.5 MIN. | 1.75 MIN. |
| SPRAY RINSE TIME | .75 MIN. | .25 MIN. | 1.25 MIN. |
| RINSE TIME | 2 MIN. | 1.5 MIN. | 2.5 MIN. |
| FINAL SPIN TIME | 5.5 MIN. | 4 MIN. | 7 MIN. |
| TOTAL DRY TIME | 24 MIN. | 15 MIN. | 180 MIN. |
| STANDARD COOL TIME | 2 MIN. | 1.5 MIN. | 8 MIN. |
| EXTRA COOL TIME | 4 MIN. | 3 MIN. | 8 MIN. |

The various parameters of TABLE I are further explained as follows:

SOAK TIME: The time, in seconds, of the soak portion of the wash cycle. The data ranges from 0 to 65535 seconds, this translates to maximum time of 18.2 hours. The data is stored in the controller memory 23 as two bytes.

WASHER TIME: The time, in seconds, of the wash agitation portion of the wash cycle. The data ranges from 0 to 65535 seconds; this translates to maximum time of 18.2 hours. The data is stored in the controller memory 23 as two bytes.

SPIN TIME: The time, in seconds, of the first spin portion of the wash cycle. The data ranges from 0 to 65535 seconds; this translates to maximum time of 18.2 hours. The data is stored in the controller memory 23 as two bytes.

SPRAY RINSE DELAY: The time, in seconds, of the first spin portion of the wash cycle prior to the commencement of the spray rinse portion of the cycle. This time is needed to ensure that the water is drained from the machine and the machine has had an opportunity to enter a high velocity spin. The data ranges from 0 to 65535 seconds; this translates to 18.2 hours. The data is stored in the controller memory 23 as two bytes.

SPRAY RINSE TIME: The time, in seconds, of the spray portion of the first spin portion of the wash cycle. When the spray rinse is activated, the water solenoids selected for rinse are opened to decrease the residual sudsing from the drain of the wash water. The data ranges from 0 to 65535 seconds; this translates to 18.2 hours. The data is stored in the controller memory 23 as two bytes.

RINSE TIME: The time, in seconds, of the rinse agitation portion of the wash cycle. The data ranges from 0 to 65535 seconds; this translates to maximum time of 18.2 hours. The data is stored in the controller memory 23 as two bytes.

FINAL SPIN TIME: The time, in seconds, of the final spin portion of the wash cycle. The data ranges from 0 to 65535 seconds; this translates to maximum time of 18.2 hours. The data is stored in the controller memory 23 as two bytes.

TOTAL DRY TIME: The time, in seconds, of the total dryer cycle. The data ranges from 0 to 65535 seconds; this translates to maximum time of 18.2 hours. The data is stored in the controller memory 23 as two bytes.

STANDARD COOL TIME: The time, in seconds, of the standard cool down time of the dryer cycle. The standard cool time is the length of time at the end of the cycle that the heaters are turned off during a standard dryer cycle. The data ranges from 0 to 65535 seconds; this translates to maximum time of 18.2 hours. The data is stored in the controller memory 23 as two bytes.

EXTRA COOL TIME: The time, in seconds, of the extra cool down time of the dryer cycle. The extra cool time is the length of time at the end of the cycle that the heaters are turned off during a dryer cycle with an extended cool down cycle. The data ranges from 0 to 65535 seconds; this translates to maximum time of 18.2 hours. The data is stored in the controller memory 23 as two bytes.

In addition to the above parameters relating to time durations, the programming can include other parameters.

One additional parameter is a set of WASHER FLAGS, conveniently represented as a single byte. These flags are used by the control system 20 when installed in a washer to enable or disable features. The feature controlled by bit 0 (the least significant bit) is the lid switch timer interrupt. This flag is used to indicate that the timer should stop when the lid of the washing machine is raised. If the flag is a one, the timer will stop; if the flag is a zero, the timer will continue to run. The feature controlled by bit 1 is the warm rinse option. If the bit is set, the washer will use warm water during the rinse cycle; if the bit is not set, the washer will use cold water during the rinse cycle.

Other additional parameters are washing machine water level and clothes dryer drying temperature. Thus, washing machine water level and clothes dryer drying temperature can be programmed by the operator of commercial laundry machines via the communication link such that these particular parameters become internally programmed or predetermined, and are outside the control of the user. Implementations of these two parameters (as water level Programmed Set Point and dryer temperature Programmed Set Point) are described hereinbelow with reference to the fuzzy logic implementation of FIGS. 9–23, and with reference to FIG. 18.

Machine-Specific Routines

FIGS. 7A through 7G are a flowchart of the washer routines, and FIGS. 8A and 8B are a flowchart of the dryer routines. From these flowcharts, it will be seen that the various parameter values, as just described, are employed to control the time duration of the various operational modes appropriate to the particular appliance.

In particular, and referring now to FIGS. 7A through 7G, execution of the washer routine begins with determining the status of the Cycle Start Flag at decision Box 300. If the flag is set, a new cycle is set to begin, and the Cycle Start Flag is reset, and the Wash Fill Flag is Set at Box 302. Execution continues with decision Box 304 if the Cycle Start Flag is not set at decision Box 300 and upon completion of Box 302. If the Wash Fill Flag is set at decision Box 304, the selector switches 42a are read to determine if hot or warm water is being called for at decision Box 306. If hot or warm water is required, the hot water solenoid 54 is energized at Box 308. Decision Box 310 determines if cold or warm water is needed and Box 312 energizes the cold water solenoid 52 as required. The status of the water level is monitored at decision Box 314, and if a Full condition is not detected, a return to the FIG. 4 routine is executed at Box 318. If the Full condition is met at decision Box 314, the Wash Fill flag is reset to indicate completion of the wash fill process, and the soak timer is reset and the soak flag is set in preparation for the impending soak procedure at Box 316 prior to returning to the FIG. 4 routine at Box 318.

If the Wash Fill Flag is not set at decision Box 304, the status of the Soak Flag is determined at decision Box 320. If the Soak Flag is set, indicating a pending soak procedure, the Soak Timer is incremented at Box 322 and the Soak Timer is compared against a predetermined Soak Time at decision Box 324. If the Soak Timer is not equal to the predetermined Soak Time, the execution continues with a return to the FIG. 4 routine at Box 334. If the Soak Timer is equal to the predetermined Soak Time, indicating a completion of the soak period, the Soak flag is reset at Box 326. To prepare the machine for the pending wash cycle, the Wash Flag is set at Box 328, the Wash Start Flag is set at Box 330, and the Wash Timer is reset at Box 332 prior to returning to the FIG. 4 routine at Box 334.

If the Soak Flag is not set at decision Box 320, the status of the Wash Start Flag is checked at decision Box 336, if the Wash Start Flag is set, the Wash Start Flag is reset at Box 338. The selector switches 42a are monitored to determine if slow agitation is requested at decision Box 340. If slow agitation is required, the washing machine is placed into slow speed at Box 342 by energizing RL3. The motor direction is then set for agitation and the motor 46 energized at Box 344. Upon energizing the motor at Box 344 or determining that the Wash Start Flag is not set at decision Box 336, the status of the Wash Flag is checked at decision Box 346. If the Wash Flag is set, the Wash Timer is incremented at 348 and compared against a predetermined Wash Time at decision Box 350. If the Wash Timer has not yet reached the predetermined Wash Time, a return to the FIG. 4 routine is executed at Box 353; otherwise, if the Wash Timer is equal to the Wash Time, the motor is turned off, and the Wash Flag is reset at Box 352 to indicate completion of the wash phase, and the Spin Flag is set, the Spin Start Flag is set, and the Spin Timer is reset in preparation for the impending spin phase prior to returning to the FIG. 4 routine.

If the Wash Flag is not set at decision Box 346, the status of the Spin Start Flag is checked at decision Box 354. If the Spin Start Flag is set, the spin is initiated by resetting the Spin Start Flag, setting the machine into the normal speed and spin configuration, energizing the motor, and resetting the Delay Timer and Spray Timer at Box 356. Execution then continues with decision Box 358 where the status of the Spin Flag is checked. If the Spin Flag is set, the Spin Timer is incremented at Box 360 and compared against a predetermined Spin Time at decision Box 362. If the Spin Timer has not yet reached Spin Time, the Delay Timer is compared to a predetermined Rinse Delay Time at decision Box 364. If the Delay Timer has not yet reached the predetermined time, the Delay Timer is incremented at Box 366 prior to the returning to the FIG. 4 routine at Box 368. If the Delay Timer has reached the predetermined Rinse Delay Time at decision Box 364, the Spray Timer is compared against a predetermined Spray Time at decision Box 380. If the Spray Timer has not yet reached the Spray Time, the Spray Timer is incremented and the cold water valve is turned on at Box 382 prior to returning to the FIG. 4 routine. If the Spray Timer is equal to the Spray Time, the spray rinse process is complete and the cold water valve is turned off at Box 284 prior to returning to FIG. 4 routine. Once the Spin Timer reaches the predetermined Spin Time at decision Box 362, the Spin Flag is reset at Box 386, the Rinse Fill Flag is set at Box 388 and the motor stopped at Box 390 to complete the spin process and prepare for the impending rinse fill process. It will be understood that the delay and spray times are incorporated into the spin time; the spin process is running concurrently with first the delay process, and secondly with the spray process.

If the Spin Flag is not set at decision Box 358, the status of the Rinse Fill Flag is checked at decision Box 392. If the Rinse Fill Flag is set, the warm rinse option is checked at decision Box 396. The warm rinse option may be set by a jumper, switch or programmed. If the warm rinse option is requested, the hot water solenoid 54 is turned on at Box 398. Regardless of the warm rinse option, the cold water solenoid is turned on at Box 400. The water level is monitored and checked for a full condition at decision Box 402. If the full condition is not detected, a return to the FIG. 4 routine is executed at Box 404. Once a full condition is detected, the Rinse Fill Flag is reset at Box 406 to complete the Rinse Fill process, and the Rinse Timer is reset, the Rinse Flag is set and the Rinse Start Flag is set at 408 to prepare for the impending rinse agitation.

If the Rinse Fill Flag is not set at decision Box 392, the Rinse Start Flag is checked at decision Box 410. The sequence beginning with Box 410 and continuing through Box 426 performs the rinse agitation process in the same manner as the sequence beginning with Box 336 and continuing through Box 353 performs the wash agitation. Rather than setting the machine for spin as shown in Box 352, the machine is prepared for Final Spin in Box 428.

If the Rinse Flag is not set at decision Box 420, the Final Spin Start Flag is checked at decision Box 430. If the Final Spin Start Flag is set, the Final Spin Start Flag is reset, the machine placed into a normal speed spin configuration, and the motor started in Box 432. The Final Spin Flag is monitored at decision Box 434. If the Final Spin Flag is set, the Final Spin Timer is incremented at Box 436, and the Final Spin Timer is compared against a predetermined Final Spin Time at decision Box 438. If the Final Spin Timer is not equal to the Final Spin Time, a return to the FIG. 4 routine is executed at Box 440. If the Final Spin Timer is equal to the Final Spin Time, the Final Spin Flag is reset at Box 442 and the motor stopped at Box 444 to complete the Final Spin Process and the Cycle in Progress Flag is reset at Box to indicate completion of the wash cycle.

Referring now to FIGS. 8A through 8B, execution of the Dryer Routine begins with checking the Cycle Start Flag at decision Box 500 and setting the Time Remaining to the predetermined Total Dry Time at decision Box 502 and resetting the Cycle Start Flag at decision Box 504 if the Cycle Start Flag is found to be set at decision Box 500. The motor 70 is then energized at Box 506, and the Time Remaining is decremented 1/120 second, the time period for the execution of one complete pass through the program, at decision Box 508. The selector switch 42b is then read to determine if extra Cool Down is required at decision Box 510. If extra Cool Down is not required, the Time Remaining is compared against the predetermined Standard Cool Down at decision Box 512. As long as the Time Remaining is greater than the Standard Cool Down, the heaters 74 and 76 are enabled. Decision Box 514 determines whether low heat is selected; if selected, only the low heater 74 is enabled at decision Box 516; otherwise, both heaters 74 and 76 are enabled at decision Box 518. If the Time Remaining is not greater than the Standard Cool Down at decision Box 512, both heaters 74 and 76 are disabled at decision Box 520. If extra Cool Down is selected at decision Box 510, the Time Remaining is compared against the Extra Cool Down at decision Box 522. If the Time Remaining is greater than the Extra Cool Down, Boxes 514, 516, and 518 are executed as previously described. If the Time Remaining is not greater than the Extra Cool Down, the heaters are disabled at Box 524.

Execution continues with decision Box 526 from Boxes 516, 518, 520, and 524. The Variation Flag, which is set in the FIG. 4 routine, is checked in decision Box 526. If the Variation Flag is set, the predetermined Variation Time is added to the Time Remaining at decision Box 528, and the Variation Flag is reset at decision Box 530. Decision Box 532 then determines if the Time Remaining is greater than zero and executes a return to the FIG. 4 routine at decision Box 536 if the Time Remaining is greater than zero. If the Time Remaining has reached zero, the motor is turned off at Box 534 and the Cycle in Progress Flag is reset at decision Box 538 to complete the dryer cycle.

Fuzzy Logic Controller Overview

Included within the microcontroller 22 is a programmable, reconfigurable fuzzy logic controller which, in this implementation, receives two inputs, Input1 and Input2, and produces a control output. For convenience, it will be appreciated that the fuzzy logic controller is implemented as part of the microprocessor control.

It is a feature of the invention that the structure of the fuzzy logic controller is identical for all applications, but the functioning of the fuzzy logic controller in a particular operating environment is determined by a set of parameters which are selected for the particular environment (e.g. an appliance controller), as described hereinbelow. In this particular implementation, the parameters (which may also be termed definition data) comprise 47 data bytes. Along with this information a single byte specifies a controller set point.

Thus, what is fixed is the definition of fuzzy logic inferencing and defuzzification methods, although the inferencing rules themselves are reprogrammable. The structure of the controller disclosed herein provides for two inputs and one output, although in the case of the washer water level control, only one input is used. Corresponding to each input is a set of input membership functions for that particular input. In accordance with the invention, the precise definitions of the input membership functions are reprogrammable. For convenience in the particular implementation herein, the input membership functions each have a predetermined general shape, but the particular topology is specified by the programmable parameters.

Possible values for each input extend over a range which is known as the universe of discourse, or alternatively, as the domain. In the implementation described herein, each input value is represented by a single eight-bit byte, for a total of 256 possible values, which comprise the universe of discourse.

Corresponding to each input are a set of input membership functions, which each have a function value, also known as a degree of belief (DOB), depending upon the input value. Each membership function defines the degree of belief of a particular input value within the universe of discourse.

In the disclosed embodiment there are two inputs, Input1 and Input2. Input1 has five corresponding membership functions to cover the 256 points of the universe of discourse. These five membership functions are labeled F1, F2, F3, F4 and F5. In addition, linguistic labels are given to each membership function. For example, in the case of the washer water level control, the linguistic labels for the five membership functions are respectively VS (very small), S (small), M (medium), L (large) and VL (very large). These labels are for design purposes only, inasmuch as the controller is concerned only with a numeric representation of the input membership functions.

Figure 9B:
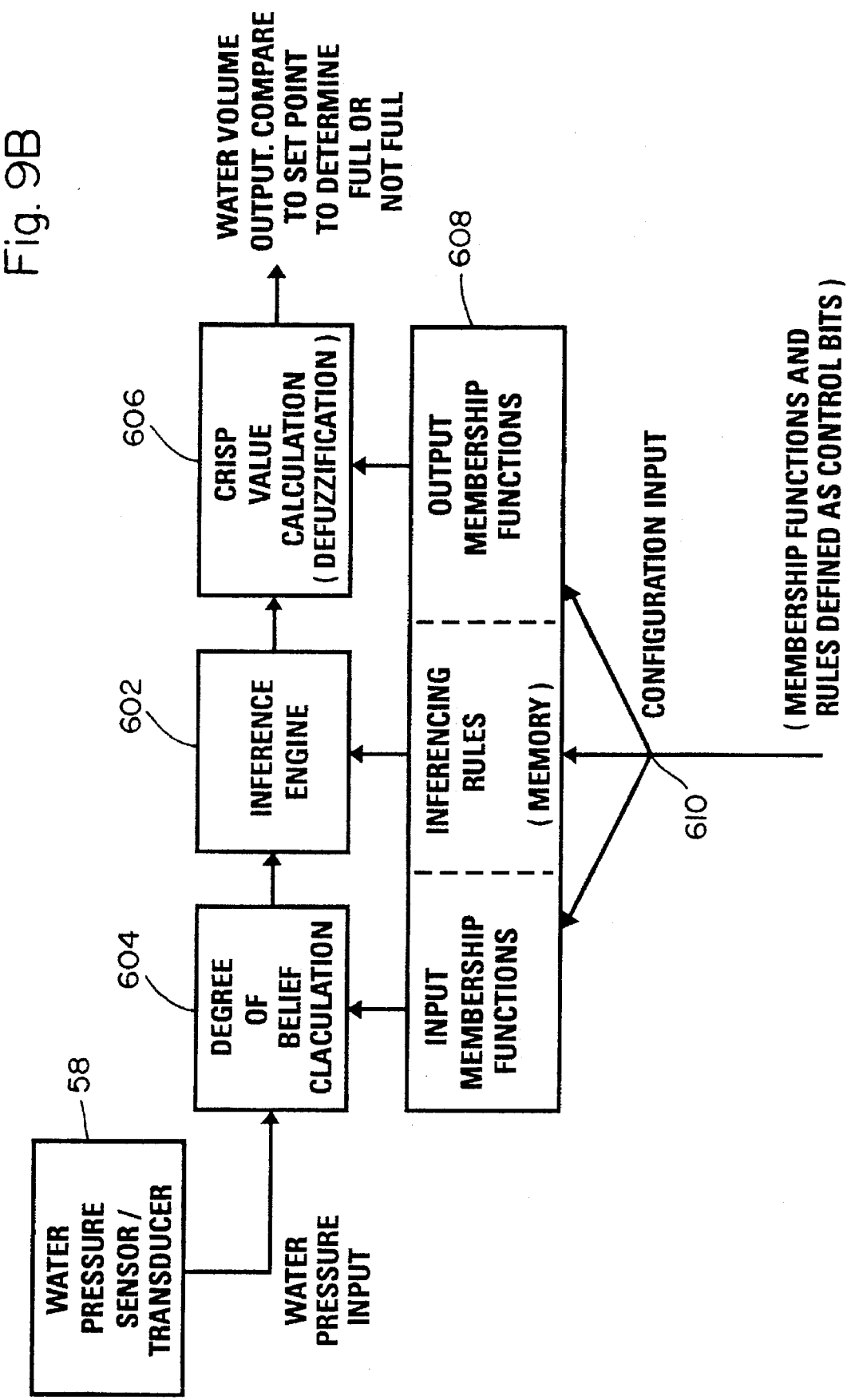
FIG. 9 is a graph depicting generalized membership functions of a first input to the fuzzy logic controller.

FIG. 9 graphically represents the Input1 membership functions F1, F2, F3, F4 and F5. As shown in FIG. 9, each of the five membership functions is represented by a triangle. Given these general shapes, a total of thirteen points P0 through P12 can completely represent the Input1 membership functions, as the points are connected by straight lines. Membership functions F1 and F5 each require two points (represented as two bytes) to define the membership function. Membership function F1 is a maximum, one, at the minimum value of the universe of discourse P0. The point P1 defines the value of the universe of discourse at which the value of the membership function (Degree of Belief or DOB) for F1 attains the value of zero. All points greater than P1 have a zero degree of belief for F1. Three points define each of the other membership functions, F2–F4. The first point sets the leftmost point of the membership function, the second point sets the point at which the degree of belief attains the value one, and the third point sets the rightmost point of the range of the membership function.

Formal mathematical representations of these five Input1 membership functions are as follows:

$$F1_{DOB} = \frac{-(x-P1)}{P1-0} \;; P0 \leq x \leq P1$$

$$F1_{DOB} = 0; x > P1$$

$$F2_{DOB} = \frac{(x-P2)}{P3-P2} \;; P2 \leq x \leq P3$$

$$F2_{DOB} = \frac{-(x-P4)}{P4-P3} \;; P3 < x \leq P4$$

$$F2_{DOB} = 0; x < P2 \text{ or } x > P4$$

$$F3_{DOB} = \frac{(x-P5)}{(P6-P5)} \;; P5 \leq x \leq P6$$

$$F3_{DOB} = \frac{-(x-P7)}{P7-P6} \;; P6 < x \leq P7$$

$$F3_{DOB} = 0; x < P5 \text{ or } x > P7$$

$$F4_{DOB} = \frac{(x-P9)}{(P9-P8)} \;; P8 \leq x \leq P$$

$$F4_{DOB} = \frac{-(x-P10)}{P10-P9} \;; P10 < x \leq P9$$

$$F4_{DOB} = 0; x < P8 \text{ or } x > P10$$

$$F5_{DOB} = \frac{(x-P11)}{(255-P11)} \;; P11 \leq x \leq P12$$

$$F5_{DOB} = 0; x < P11$$

Figure 10A:
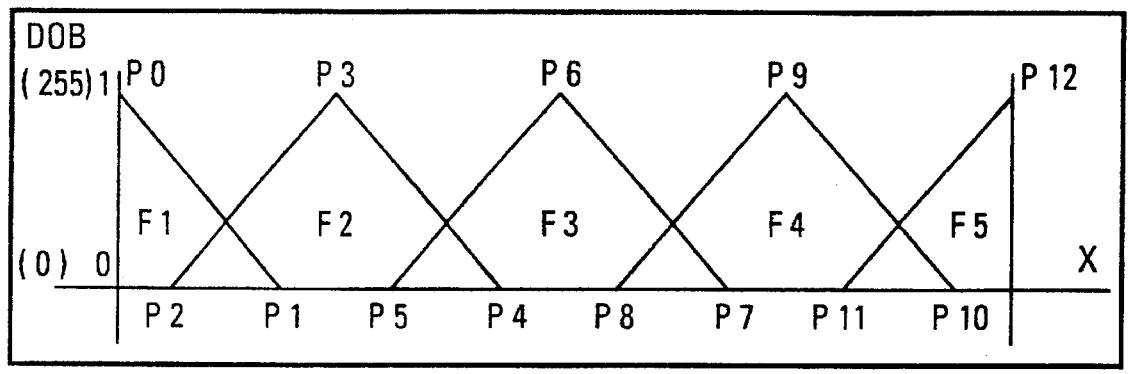
FIG. 10 is a graph depicting generalized membership functions of a second input to the fuzzy logic controller of the invention.
Figure 10B:
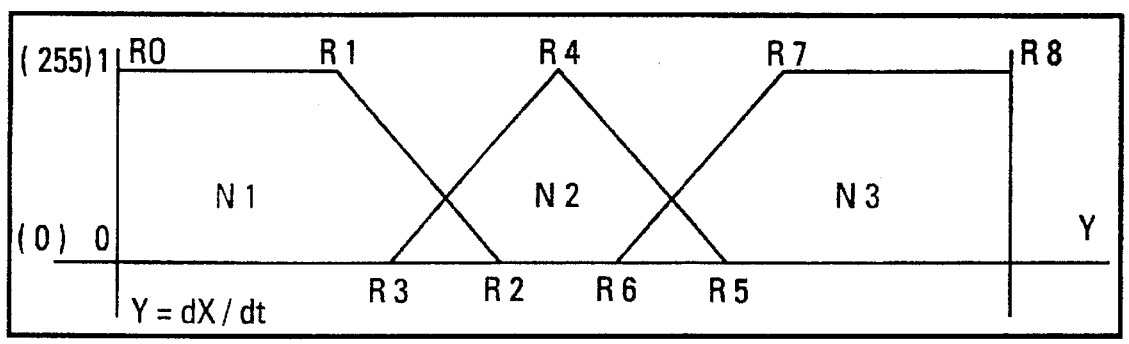

The universe of discourse for Input2 contains three membership functions, labeled N1, N2 and N3. FIG. 10 similarly graphically represents the Input2 membership functions, and they are more formally represented mathematically as follows:

$$N1_{DOB} = 1; R0 \leq Y \leq R1$$

$$N1_{DOB} = \frac{-(Y-R2)}{R2-R1} \;; R1 < Y \leq R2$$

$$N1_{DOB} = 0; Y > R2$$

$$N2_{DOB} = \frac{(Y-R3)}{(R4-R3)} \;; R3 \leq Y \leq R4$$

$$N2_{DOB} = \frac{-(Y-R5)}{R5-R4} \;; R4 \leq Y \leq R5$$

$$N2_{DOB} = 0; Y < R3 \text{ or } Y > R5$$

$$N3_{DOB} = \frac{(Y-R7)}{(R7-R6)} \;; R6 \leq Y \leq R7$$

$$N3_{DOB} = 1; R7 \leq Y \leq R8$$
$$N3_{DOB} = 0; Y < R6$$

Figure 11:
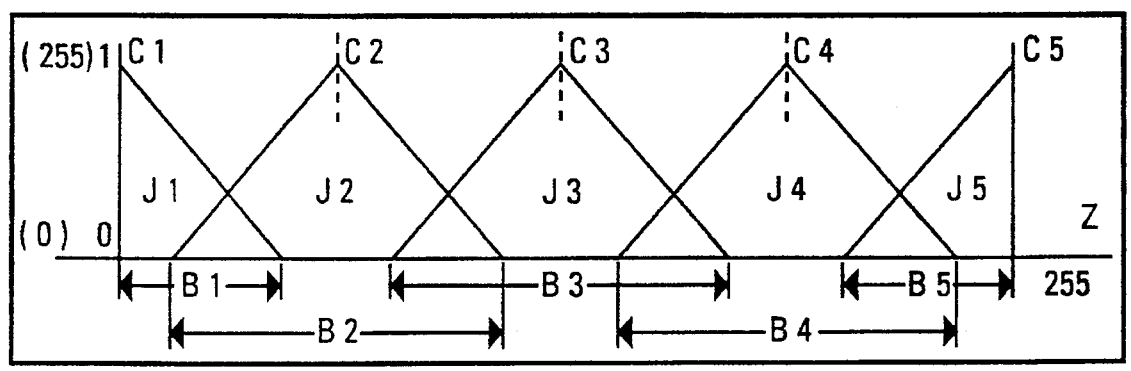
FIG. 11 is a graph depicting generalized output membership functions of the fuzzy logic controller of the invention.

As graphically represented in FIG. 11, five membership functions J1 through J5 cover the universe of discourse for the output. Applying a different approach (compared to the input membership functions) which results in convenience in implementation, triangles with fixed base lengths (B1–B5) and centroid positions (C1–C5) represent the output membership functions. Centroid positions C1 and C5 are placed at the minimum and maximum output value, respectively. However, like Input1 and Input2, the output universe of discourse breaks down into a maximum of 256 distinct output levels. Thus a single byte may represent one of the 256 distinct output levels.

In summary, thirteen bytes define the five membership functions for Input1. Each byte defines a point on one of the five membership functions represented in FIG. 9. Nine bytes define the three membership functions for Input2. Each byte defines a point on one of the three membership functions represented in FIG. 10. Ten bytes define the output membership functions represented in FIG. 11, five base lengths and five corresponding centroid positions. A control setpoint is represented with one byte. With a maximum fifteen byte rule base, the total memory needed to represent a complete control is forty eight bytes.

A predetermined inferencing technique, rules, and defuzzification method define the mapping of input levels to output levels. Max.-Dot inferencing is used to execute the controller rules. The Input1 and Input2 membership functions are employed to calculate the degree of belief for each input. The inferencing of the rules then utilizes the degree of belief calculations. Max.-Dot inferencing scales the output membership functions by an amount equal to the minimum degree of belief for the inputs of the corresponding rule. The scaled area of an output membership function of a rule is proportional to the product of the base and the minimum degree of belief for the inputs of the rule.

The inferencing rules follow the format below. An example of Max.-Dot inferencing is shown in the following example, and graphically in FIGS. 12A, 12B and 12C.
Rule format in general:
If Input1 is Class1 and Input2 is Class2 then Output is Class3
Rule format example:
Let Input1 be Temperature, Input2 be Change of Temperature, and the Output be Duty Cycle. A possible rule is: "If Temperature is Large and Change of Temperature is Low then Duty Cycle is Slow."
The minimum degree of belief between the membership function Large (for the input Temperature) and Low (for the input Change of Temperature) scales the output membership function Slow (for the output Duty Cycle).

Centroid defuzzification transforms the scaled output membership functions into a crisp value (i.e. a value which is not fuzzy). This method sums the product of the scaled membership function areas and the corresponding position of the centroids of the membership functions and divides that with the sum of the scaled membership function areas. The equation of the crisp output Z is:

$$Z = \frac{\Sigma \text{Area}\_i * \text{Centroid}\_i}{\Sigma \text{Area}\_i}$$

The following specific EXAMPLE inferences two rules with Max.-Dot inferencing and calculates the crisp output with the Centroid defuzzification method.

EXAMPLE

IF X is S and Y is Neg. then Z is S.
IF X is VS and Y is Neg. then Z is VS.

The two rules evaluate as shown above. For example, the input X is measured by the control logic to be 10 units (FIG. 12A) and the input Y is measured to be −50 units (FIG. 12B). The degree of belief for each linguistic variable is calculated. In particular, the degree of belief is 0.2 for membership function "VS", 0.5 for membership function "S", and 0.9 for membership function "Neg". The first rule scales the output membership function "S" according to the minimum degree of belief of "X is S" (0.5) and "Y is Neg." (0.9). The minimum value is 0.5 for this rule. Consequently, the output membership function (S) is scaled to 0.5. The second rule scales the output membership function "VS" to the minimum degree of belief of "X is VS" (0.2) and "Y is Neg." (0.9). The minimum value is 0.2 for this rule; consequently, the output membership function (VS) is scaled to 0.2. The crisp output of the controller under these conditions is 12.5 units which is the centroid of the two scaled triangles of FIG. 12C.

A controller will generally have more than two rules; the subject programmable reconfigurable fuzzy controller may have up to a maximum of fifteen rules. Each rule utilizes a one byte notation to encode a grouping of a membership function for Input1, a membership function for Input2 and a membership function for the output. The first most significant three bits designate a particular one of the membership functions for Input1. The next two bits designate a particular one of the membership functions for Input2. The final three bits designate a particular one of the Output membership functions to scale. Fifteen bytes cover the maximum number of rules. When fewer than the maximum number of rules are needed, the remaining bytes are zero.

The rule coding is summarized in the following TABLE II. As indicated in TABLE II, bits 7, 6 and 5 of the Rule Byte specify the Input1 membership function; bits 4 and 3 of the Rule Byte specify the Input2 membership function; and bits 2 and 1 specify the Output membership function for the particular rule. In TABLE II, an "X" in a particular bit position means the bit value is defined in another row of the table.

TABLE II

| | MSB | | RULE BYTE | | | | | LSB |
|---|---|---|---|---|---|---|---|---|
| | 7 | 6 | 5 | 4 | 3 | 2 | 1 | 0 |
| N0 Input1 function | 0 | 0 | 0 | X | X | X | X | X |
| F1 Input1 function | 0 | 0 | 1 | X | X | X | X | X |
| F2 Input1 function | 0 | 1 | 0 | X | X | X | X | X |

TABLE II-continued

| | MSB | | RULE BYTE | | | | | LSB |
|---|---|---|---|---|---|---|---|---|
| | 7 | 6 | 5 | 4 | 3 | 2 | 1 | 0 |
| F3 Input1 function | 0 | 1 | 1 | X | X | X | X | X |
| F4 Input1 function | 1 | 0 | 0 | X | X | X | X | X |
| F5 Input1 function | 1 | 0 | 1 | X | X | X | X | X |
| N0 Input2 function | X | X | X | 0 | 0 | X | X | X |
| N1 Input2 function | X | X | X | 0 | 1 | X | X | X |
| N2 Input2 function | X | X | X | 1 | 0 | X | X | X |
| N3 Input2 function | X | X | X | 1 | 1 | X | X | X |
| J1 Output function | X | X | X | X | X | 0 | 0 | 1 |
| J2 Output function | X | X | X | X | X | 0 | 1 | 0 |
| J3 Output function | X | X | X | X | X | 0 | 1 | 1 |
| J4 Output function | X | X | X | X | X | 1 | 0 | 0 |
| J5 Output function | X | X | X | X | X | 1 | 0 | 1 |
| NO RULE | 0 | 0 | 0 | 0 | 0 | 0 | 0 | 0 |

The following example of rule coding illustrates: "If Temperature is Large and Change of Temperature is Low then Duty Cycle is Slow."

If Input1 membership function F4 represents large and Input2 membership function N1 represents slow, and output membership function J2 represents Slow, then the rule is represented in memory by 10001010 (8A hex).

Figure 13:
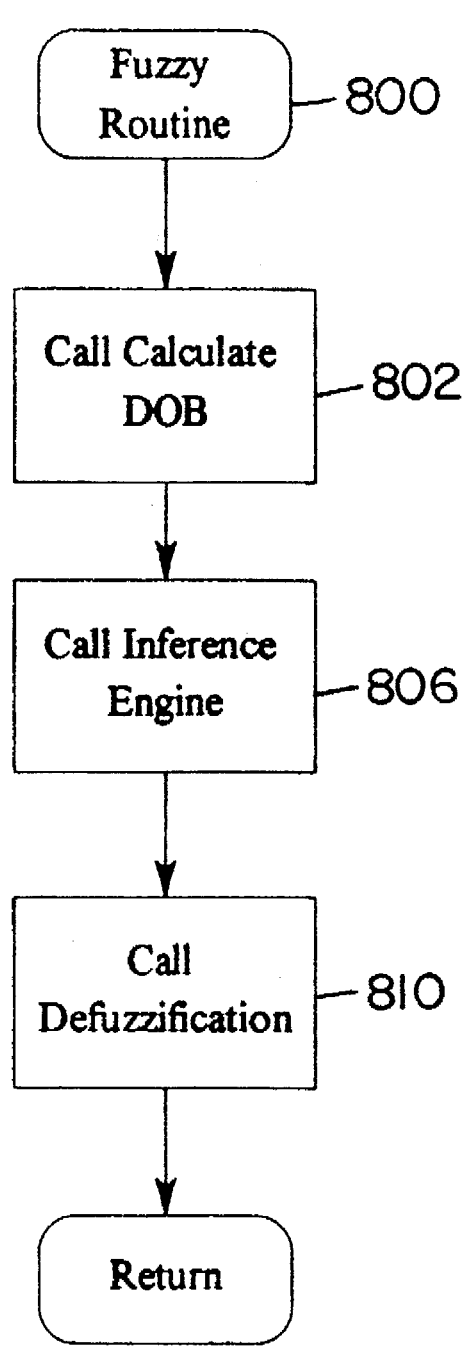
FIG. 13 is a flowchart representing a fuzzy logic routine.

FIG. 13 is a flowchart illustrating a general-purpose Fuzzy Routine 800 in overview. The FIG. 13 Fuzzy Routine 300 is called by the Fuzzy System routine 114 of FIG. 18, which in turn is called by Box 112 of the FIG. 4 Main Program. As described hereinbelow in more detail, the FIG. 13 Fuzzy Routine calls a CALCULATE DEGREE OF BELIEF subroutine shown in FIG. 14, which in turn calls a DOB_CALC function routine shown in FIG. 15. The FIG. 13 Fuzzy Routine 800 also calls an INFERENCE ENGINE routine shown in FIG. 16, and a DEFUZZIFICATION routine shown in FIG. 17.

Figure 14:
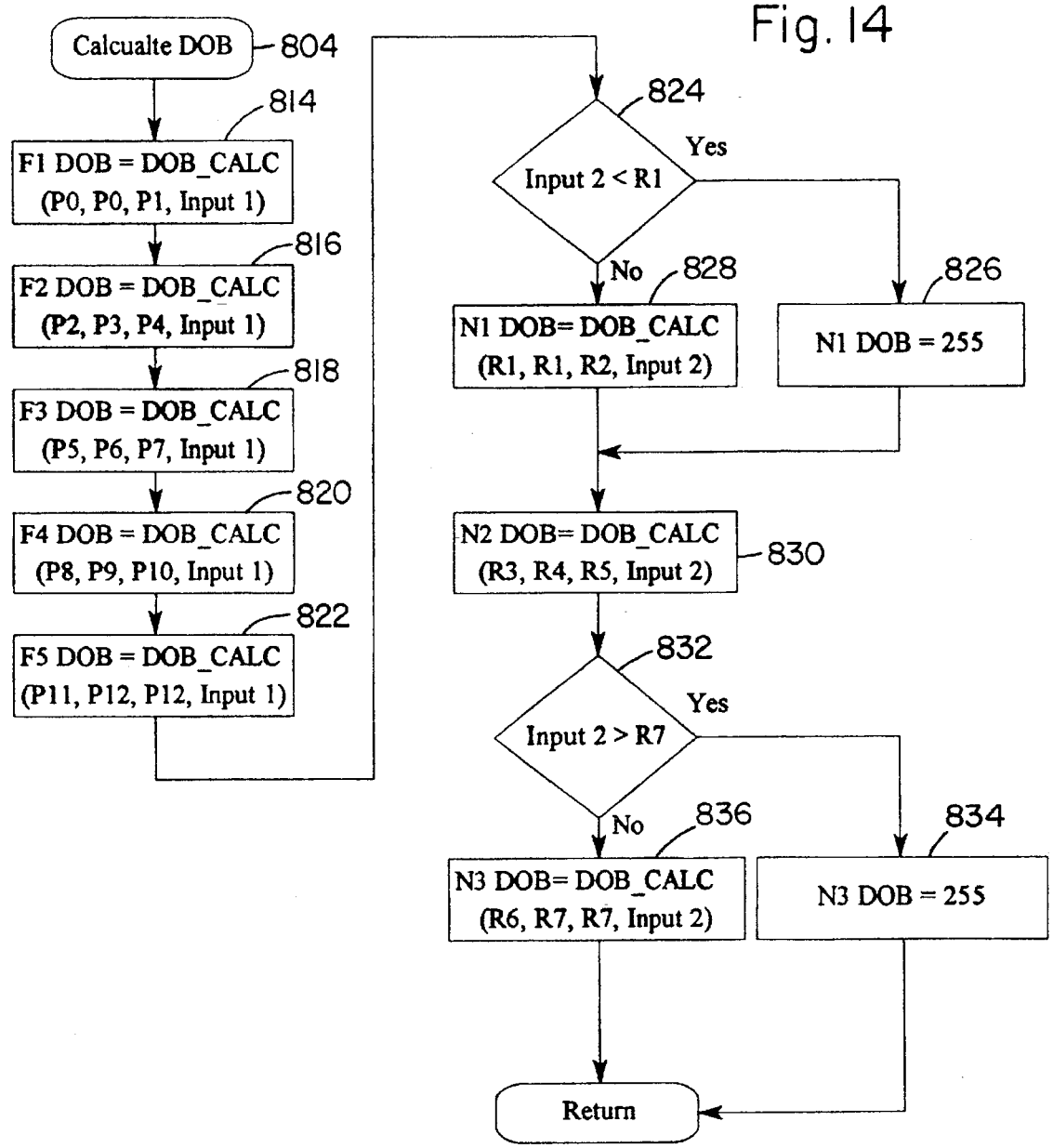
FIGS. 14 and 15 are flowcharts representing a routine to calculate a degree of belief for input functions.
Figure 16:
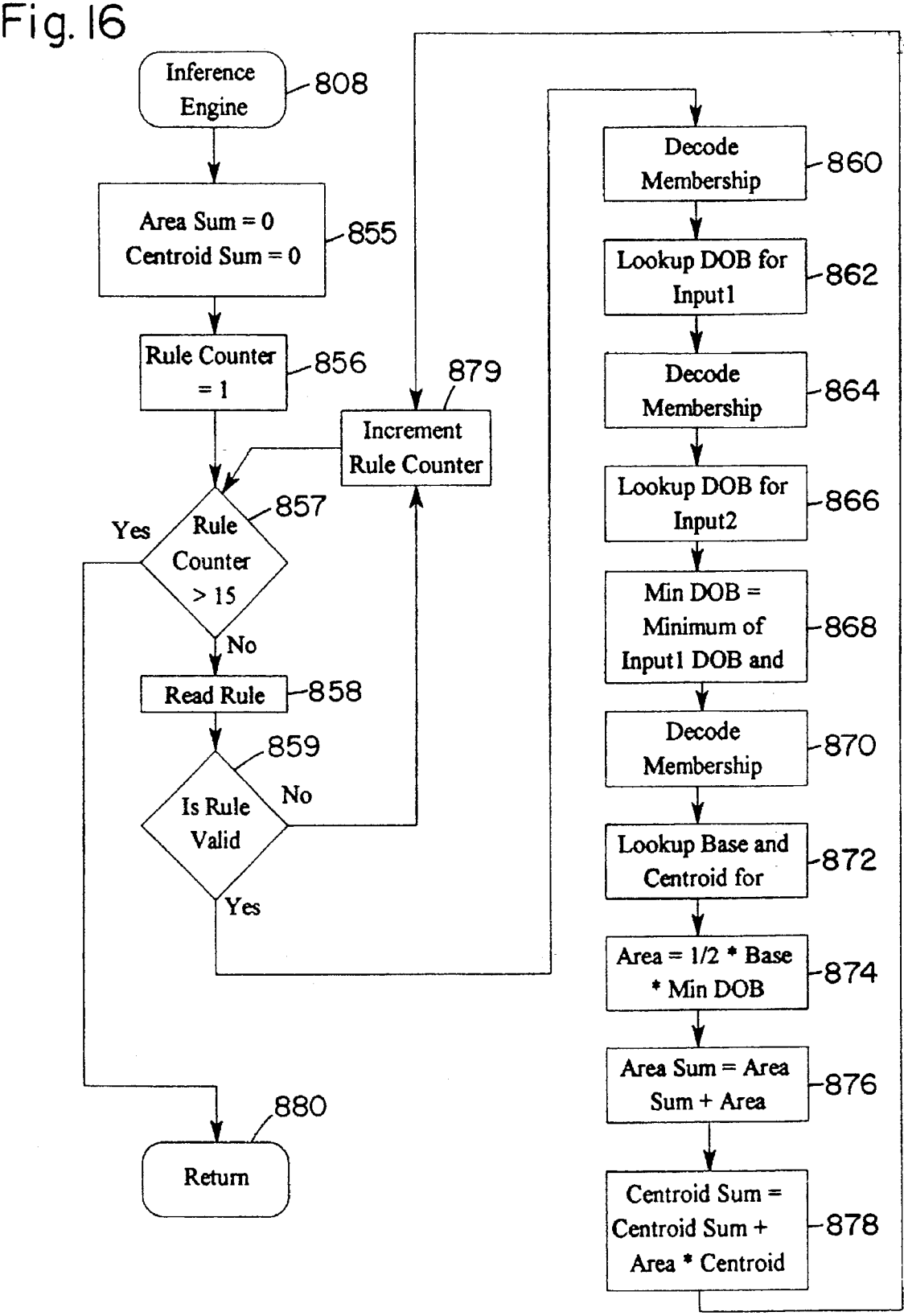
FIG. 16 is a flowchart representing a fuzzy logic inference engine.
Figure 17:
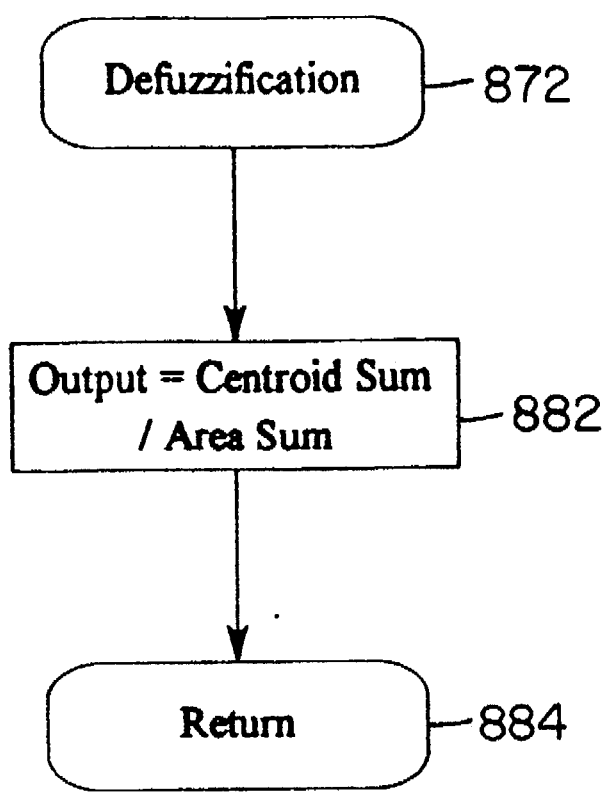
FIG. 17 is a flowchart representing a defuzzification routine.

Referring to FIG. 13 in detail, the Fuzzy Routine 800 first at Box 802 calls the FIG. 14 subroutine CALCULATE DEGREE OF BELIEF 804. CALCULATE DEGREE OF BELIEF calculates the degree of belief for each membership function of Input1 and Input2. The degree of belief values are stored in tables in microcontroller memory to facilitate indexed addressing. Next the Fuzzy Routine 800 and 806 calls the subroutine INFERENCE ENGINE 808 (FIG. 16). INFERENCE ENGINE inferences each rule and sums the area and the product of the area and centroid for each scaled output membership function. When execution returns from inferencing the fuzzy routine at 810 calls the DEFUZZIFICATION subroutine 812 (FIG. 17) to calculate a crisp output value based upon the sums determined during inferencing.

The FIG. 14 CALCULATE DEGREE OF BELIEF subroutine 804 calculates the degree of belief for Input1 by successively calling the DOB_CALC function routine 804 (FIG. 15) with appropriate parameters. To calculate the degree of belief that Input1 is in F1, the parameters LP (left point)=P0, MP (middle point)=P0, RP (right point)=P1, and input =INPUT1 are passed to the DOB_CALC routine at 814. The degree of belief for F2, F3, F4 and F5 are each determined the same way at 816, 818, 820 and 822, by passing the LP, MP, RP and INPUT1 for their corresponding triangular membership function. The decision block at 824 determines if INPUT2 is less than R1 and, if so, then the degree of belief for N1 is 255 (Block 826), otherwise the function DOB_CALC is called with parameters (R1,R1,R2, INPUT2) at 828. The degree of belief for N2 is calculated with DOB_CALC at 830. At decision block 832, if INPUT2 is greater than R7 the degree of belief is 255 Block 834, otherwise the degree of belief is calculated with DOB CALC at 836.

Figure 15:
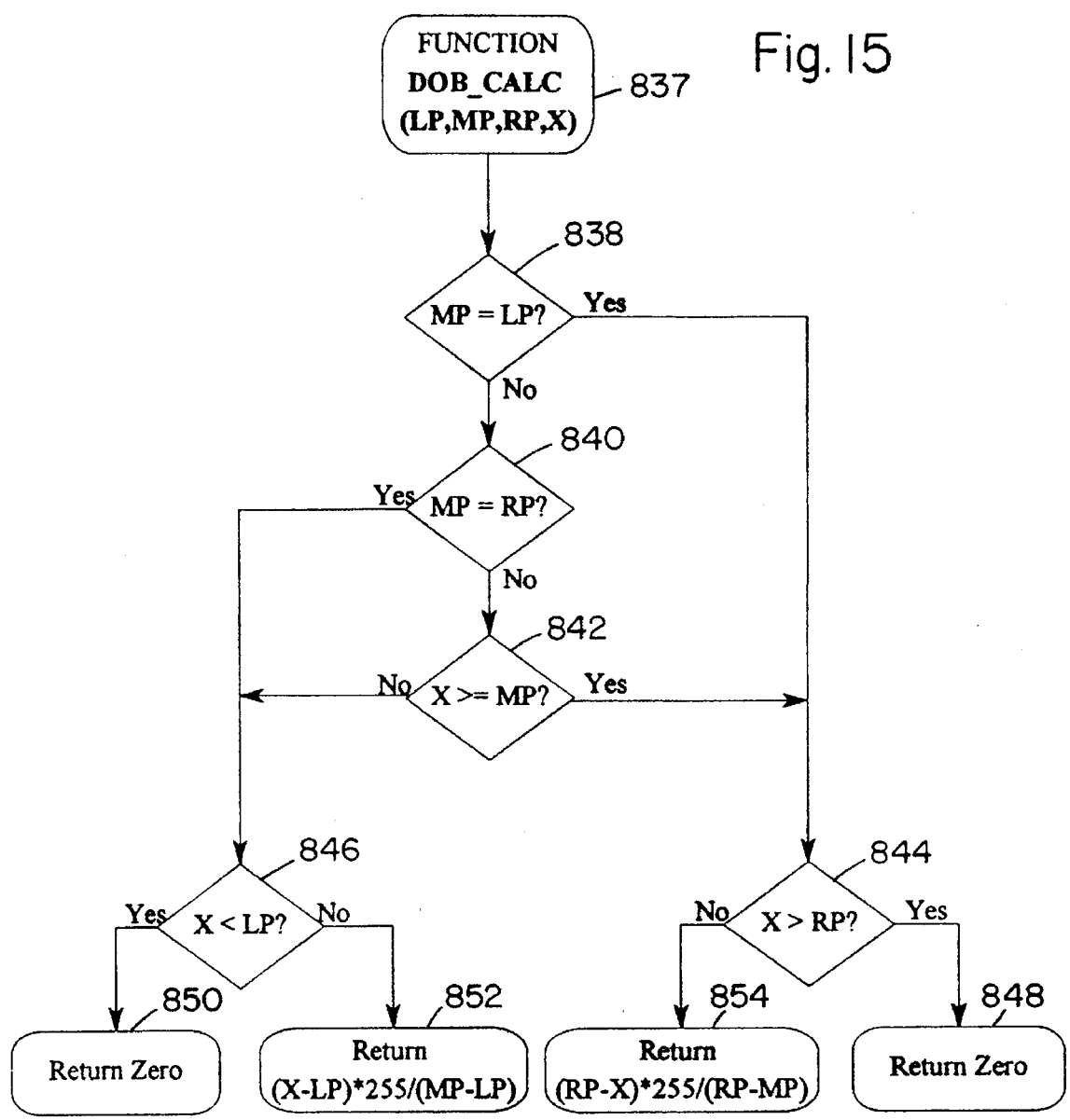

The FIG. 15 DOB_CALC function routine entered at Box 837 returns the degree of belief for an input and a triangular membership function. Fuzzy logic degree of belief results are usually represented as a real number on the interval [0,1], but for the microcontroller implementation disclosed herein the degree of belief is represented as any integer value from 0 to 255. This simplifies the implementation since the computational complexity of floating point numbers is avoided.

The degree of belief calculation is accomplished by first determining if the input is to the left or right of the middle point and then determining if the input is within the domain of the membership function. The domain of the membership function is defined as all real numbers between LP and RP. DOB_CALC first decides in decision Box 838 whether the middle point is equal to the left point. If this is true, then the input is to the right of the middle point. If the middle point is equal to the right point as determined in decision Box 840 then the input is to the left of the middle point. If the values for the left point, middle point, and the right point are all unique numbers, then the input must be compared to the middle point at decision block 842 to determine which side of the triangle the input will intersect. If the input is greater or equal to the middle point then the input is to the right of the middle point and the slope of the corresponding position on membership function is negative, otherwise the input is to the left of the middle point and the slope is positive. Decision Boxes 844 and 846 determine if the input is in the domain of the membership function. If not, then the degree of belief is returned as zero in Boxes 848 and 850, respectively. If the input is in the domain of the membership function and intersects the positive slope portion then the degree of belief is determined at block 852 as:

$$DOB = \frac{(input - LP) * 255}{(MP - LP)}$$

If the input is in the domain of the membership function and intersects the negative slope portion then the degree of belief is determined at block 854 as:

$$DOB = \frac{(RP - input) * 255}{(RP - MP)}$$

The INFERENCE ENGINE routine 808 (FIG. 16) begins with initializing the area and product summers in Box 855. A loop through the fifteen possible rules begins with initializing a Rule Counter to 1 in Box 856, and then testing the loop for completion in decision Box 857 at the top of the loop. While looping, the rule indexed by Rule Counter is loaded from the rule table in Box 858 and in Box 859 is checked to see if it is a valid rule. The Input1 linguistic variable for the rule indexed by Rule Counter in Box 860 is decoded from the rule byte, for example by conventional shifting and/or masking techniques. The decoded value is used in Box 862 to index the degree of belief table for the Input1.

Similarly, in Box 864, the Input2 linguistic variable for the rule indexed by Rule Counter is decoded from the rule byte, again for example employing conventional shifting and/or masking techniques. This value is used in Box 866 to index the degree of belief table for Input2 for the degree of belief of the linguistic variable.

In Box 868, the minimum of the two values read from the degree of belief tables is stored for later use as the variable MinDOB.

In Box 870, the output linguistic variable for the rule indexed by Rule Counter is decoded from the rule byte, again by masking and/or shifting. This decoded value is then used in Box 872 to index the output membership function base and centroid tables to give the corresponding base length and centroid position. In Box 874, the scaled output area is set equal to the ½*base*MinDOB. In Box 876, the area is summed for all scaled membership functions, and in Box 878 the product of the Area*Centroid Location is summed for all scaled membership functions.

The loop continues through Box 879 which increments the Rule Counter until all valid inference rules out of the possible total of fifteen are inferenced and execution returns to the main program in Box 880.

THE DEFUZZIFICATION routine 872 (FIG. 17) produces a crisp output value. The step at Box 882 simply takes the sum of the products of the scaled membership function centroid and the scaled membership function area divided by the sum of the scaled membership function areas, and the routine returns in Box 884.

Programmable and Reconfigurable Aspects in General

The subject fuzzy system is both programmable and reconfigurable. The programmable aspect deals with the ability to alter the performance of the fuzzy system via parameters that are downloaded to the control after manufacture and installation. The reconfigurable aspect of the fuzzy system is the ability of the same system to function in different types and models of appliances (for example washer and dryer) as well as the ability of the same fuzzy system to function either as a control system or a measurement system.

Similar to the programmable parameters of the electronic controller, the definitions for the membership functions and the rules of the fuzzy system, as well as a system setpoint, are programmed via the infrared link. The use of the programmed setpoint is dependent upon the application and is illustrated in examples hereinbelow, particularly with reference to FIG. 18.

However, the use of the programmed membership functions and rules is inherent in the functioning of the fuzzy system and is described in a context free of example. A volatile memory block of 47 bytes is allocated in the control for storage of the information defining the membership functions and the rule base of the fuzzy system. Upon initialization, the microprocessor loads the 47 bytes with default information from non-volatile memory to produce the default fuzzy system. If system parameters change, updated parameters for the membership functions and rule base are transmitted to the controller to modify the functionality of the fuzzy system. For example, a change in supply voltage for the electric dryer heaters from 240 VAC to 208 VAC requires redefining the fuzzy system parameters. These new parameters are stored over the default parameters in the volatile memory. The default parameters remain permanently stored in non-volatile memory. A suitable communications protocol is employed.

As an example, in a fuzzy parameter update mode, a communications dialogue between the remote unit 32 and the controller 20 over the communications channel 34 proceeds as follows:

| | |
|---|---|
| Remote: | stx, "F", "0", etx, crc |
| Controller: | ack |
| | or |

-continued

| | |
|---|---|
| | nak |
| Remote: | stx, "F", "1", <Washer Setpoint>, etx, crc. |
| Controller: | ack |
| | or |
| | nak |
| Remote: | stx, "F", "2", <Washer P0>, <Washer P1>, <Washer P2>, <Washer P3>, <Washer P4>, <Washer P5>, <Washer P6>, <Washer P7>, <Washer P8>, <Washer P9., <Washer P10>, <Washer P11>, <Washer P12>, etx, crc. |
| Controller: | ack |
| | or |
| | nak |
| Remote: | stx, "F", "3", <Washer R0>, <Washer R1>, <Washer R2>, <Washer R3>, <Washer R4>, <Washer R5>, <Washer R6>, <Washer R7>, <Washer R8>, etx, crc. |
| Controller: | ack |
| | or |
| | nak |
| Remote: | stx, "F", "4", <Washer C1>, <Washer B1>, <Washer C2>, <Washer B2>, <Washer C3>, <Washer B3>, <Washer C4>, <Washer B4>, <Washer C5>, <Washer B5>, etx, crc. |
| Controller: | ack |
| | or |
| | nak |
| Remote: | stx, "F", "5", <Washer Rule 1>, <Washer Rule 2>, <Washer Rule 3>, <Washer Rule 4>, <Washer Rule 5>, <Washer Rule 6>, <Washer Rule 7>, <Washer Rule 8>, <Washer Rule 9>, <Washer Rule 10>, <Washer Rule 11>, <Washer Rule 12>, <Washer Rule 13>, <Washer Rule 14>, <Washer Rule 15>, etx, crc. |
| Controller: | ack |
| | or |
| | nak |
| Remote: | stx, 'F", "6", <Dryer Setpoint>, etx, crc. |
| Controller: | ack |
| | or |
| | nak |
| Remote: | stx, "F", "7", <Dryer P0>, <Dryer P1>, <Dryer P2>, <Dryer P3>, <Dryer P4>, <Dryer P5>, <Dryer P6>, <Dryer P7>, <Dryer P8>, <Dryer P9>, <Dryer P10>, <Dryer P11>, <Dryer P12>, etx, crc. |
| Controller: | ack |
| | or |
| | nak |
| Remote: | stx, "F", "8", <Dryer R0>, <Dryer R1>, <Dryer R2>, <Dryer R3>, <Dryer R4>, <Dryer R5>, <Dryer R6>, <Dryer R7>, <Dryer R8>, etx, crc. |
| Controller: | ack |
| | or |
| | nak |
| Remote: | stx, "F", "9", <Dryer C1>, <Dryer B1>, <Dryer C2>, <Dryer B2>, <Dryer C3>, <Dryer B3>, <Dryer C4>, <Dryer B4>, <Dryer C5>, <Dryer B5>, etx, crc. |
| Controller: | ack |
| | or |
| | nak |
| Remote: | stx, "F", "10", <Dryer Rule 1>, <Dryer Rule 2>, <Dryer Rule 3>, <Dryer Rule 4>, <Dyer Rule 5>, <Dryer Rule 6>, <Dryer Rule 7>, <Dryer Rule 8>, <Dryer Rule 9>, <Dryer Rule 10>, <Dryer Rule 11>, <Dryer Rule 12>, <Dryer Rule 13>, <Dryer Rule 14>, <Dryer Rule 15>, etx, crc. |
| Controller: | ack |
| | or |
| | nak |
| Remote: | eot |

Figure 18:
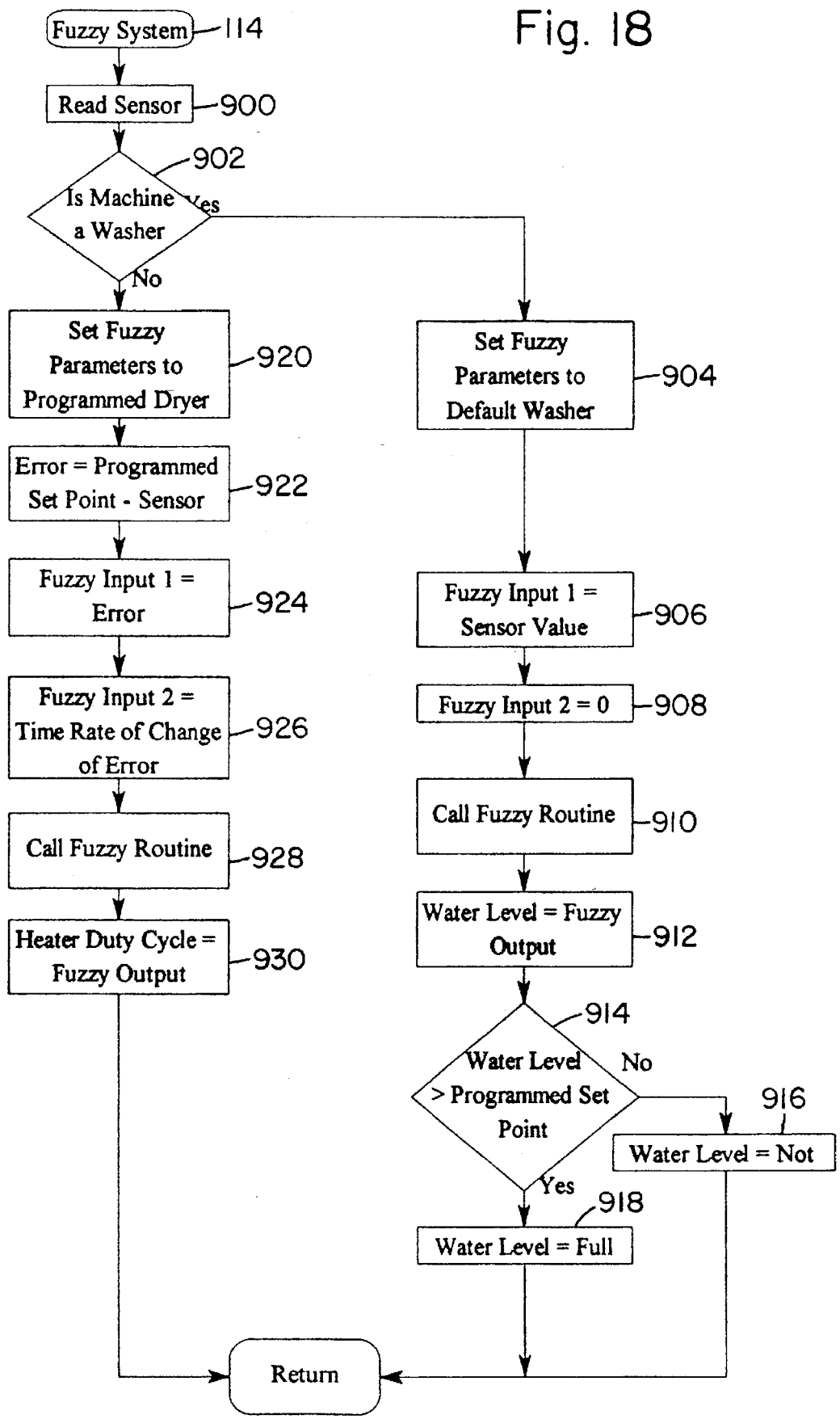
FIG. 18 is a flowchart representing a fuzzy system routine which calls the FIG. 13 fuzzy logic routine.

The reconfigurable aspect and the programmable setpoint are illustrated in the Flowchart of FIG. 18. FIG. 18 details the portion of the controller program that makes use of the fuzzy system. If the controller is installed in a washer, this portion of the program controls the water level, and if the control is installed in a dryer, this portion of the program controls the duty cycle of the heaters.

The water level control of the washer uses the fuzzy system to interpret the sensor 58 data and produce an estimate of the current water level. A simple decision block is implemented to determine if the water level is full or not full. The duty cycle control of the dryer uses the fuzzy system to interpret the sensor 80 data and produce the control action. The processing of the data prior to the fuzzy system of the dryer is not complex and is accomplished in a conventional manner. While both the washer and dryer utilize the identical fuzzy system, the washer utilizes the fuzzy system to perform data manipulation that allows a simple setpoint control system to be implemented, and the dryer utilizes conventional data processing to format the sensor data for the utilization of the fuzzy system to implement a control system.

The routine of FIG. 18 begins with the reading of the sensor data at Box 900. The type of machine is determined at decision Box 902. If the machine is a washer, the control is configured to be a water level control beginning with Box 904 where the fuzzy parameters are read from the volatile memory. If no parameters have been programmed for the washer fuzzy system, these will be the default parameters; otherwise, if parameters have been programmed for the washer fuzzy system, these will be the programmed parameters. The sensor value read at Box 900 is assigned to the first input variable, Input1, of the fuzzy system at Box 906, and the second fuzzy input, Input2, which is unused in the case of the washer, is set to zero at Box 908.

The FIG. 13 fuzzy routine 800 is called at Box 910. The crisp value returned from the Fuzzy Routine is the estimated water level and is assigned to this variable at Box 912.

The programmable setpoint water level is implemented at decision Box 914. Thus, the estimated water level is compared against the water level setpoint, either programmed or default, at decision Box 914. If the estimated water level is not greater than the setpoint, the variable Water Level is set to not full at Box 916; otherwise the variable Water Level is set to full at Box 918. The program then returns to the calling routine.

If the machine is determined to be a dryer at decision Box 902, the fuzzy system is configured to operate as a temperature control and the fuzzy parameters are read from volatile memory at Box 920 in a manner directly analogous to the manner described for Box 904 of the washer portion of the program. An error value is calculated at Box 922 as the difference between the setpoint (either programmed or default) and the sensor value read at Box 900. Fuzzy Input1 is set to the value of the error at Box 924 and fuzzy Input2 is set equal to the time rate of change of the error at Box 926.

The FIG. 13 fuzzy routine 800 is called at Box 928. It should be noted that this is the same routine called at Box 910 of the washer portion of the program. The heater duty cycle is set to the crisp output of the fuzzy system at Box 930 for direct heater control via the fuzzy system. The program then returns to the calling routine.

Specific Implementation of Machine Water Level Monitor

The water level monitor measures the pressure at the base of the washing machine tub and correlates this measured pressure with a particular volume (gallons) of water. The pressure measured by the pressure transducer directly relates to the height of the water in the tub. The height of the water has a non-linear relationship with the volume. This is partly due to the tub and basket being non-uniform in their cylindrical shape and the agitator and transmission assemblies occupying a volume. The fuzzy water level monitor adjusts for the non-linear relationships and produces an accurate calculated volume.

As previously noted, the FIG. 2 solid state pressure sensor 58 measures the pressure exerted on the bottom of the tub. The sensor (Micro Switch 26PC Series) contains four piezoresistors inside a silicon diaphragm. The diaphragm flexes with the application of a force upon the diaphragm. The piezoresistors change depending upon the amount of flex in the diaphragm. A full bridge arrangement connects the piezoresistors so that the output voltage is proportional to the input voltage and the amount of flex in the diaphragm (input pressure). For a 1 psi sensor the full scale output is 23 mV. A differential amplifier (not shown) produces a 0–2.5 V output with a 0–18 Inch $H_2O$ input.

The following TABLE III shows the relationship between the change in amplifier voltage, pressure (IN. $H_2O$), and volume (gallons). The analog to digital converter high reference is set to 2.5 volts and the low reference set to ground to convert the amplified voltage into a digital number for further calculations. After the microcontroller reads the digital number, the pressure reading is filtered and preprocessed in a conventional manner. The filtered pressure reading is then fed into the programmable fuzzy controller as the Input1.

TABLE III

| VOLTS | HEX | DECIMAL | PRESSURE (IN.$H_2O$) | VOLUME (GAL) |
|---|---|---|---|---|
| 0 | 00 | 0 | 0 | 0 |
| .05 | 05 | 5 | 1.4 | 1.8 |
| .10 | 0A | 10 | 1.8 | 2.5 |
| .15 | 0F | 15 | 2.3 | 3.3 |
| .20 | 14 | 20 | 2.7 | 4.1 |
| .24 | 19 | 25 | 3 | 4.8 |
| .29 | 1E | 30 | 3.5 | 5.5 |
| .34 | 23 | 35 | 4 | 6.5 |
| .39 | 28 | 40 | 4.38 | 7 |
| .44 | 2D | 45 | 4.8 | 7.8 |
| .48 | 32 | 50 | 5.2 | 8.35 |
| .54 | 37 | 55 | 5.7 | 9.3 |
| .59 | 3C | 60 | 6 | 9.9 |
| .63 | 41 | 65 | 6.5 | 10.8 |
| .68 | 46 | 70 | 6.9 | 11.5 |
| .73 | 4B | 75 | 7.3 | 12.3 |
| .78 | 50 | 80 | 7.8 | 13.1 |
| .83 | 55 | 85 | 8 | 13.8 |
| .88 | 5A | 90 | 8.6 | 14.5 |
| .93 | 5F | 95 | 9 | 15.2 |
| .98 | 64 | 100 | 9.5 | 16 |
| 1.03 | 69 | 105 | 9.9 | 16.8 |
| 1.07 | 6E | 110 | 10.3 | 17.6 |
| 1.12 | 73 | 115 | 10.6 | 18.1 |
| 1.17 | 78 | 120 | 11.2 | 19 |
| 1.22 | 7D | 125 | 11.6 | 19.8 |
| 1.27 | 82 | 130 | 12 | 21 |
| 1.32 | 87 | 135 | 12.5 | 21.2 |

FIG. 19 describes the topology of Input1 for the fuzzy water level monitor. The membership functions F1, F2, F3, F4 and F5 of FIG. 1 are respectively labeled VS (very small), S (small), M (medium), L (large), and VL (very large) in FIG. 19. This gives the inferencing rules a descriptive representation. The point values P0 to P12 defining the membership function are based on the foregoing TABLE III as shown in the following TABLE IV:

TABLE IV

| INPUT: Pressure Reading | | |
|---|---|---|
| P0 = 0 | P1 = 41 (4.5 IN. $H_2O$) | P2 = 0 (0 IN. $H_2O$) |
| P3 = 41 | P4 = 75 | P5 = 41 |
| P6 = 75 (7.4 IN. $H_2O$) | P7 = 108 (10 IN. H20) | P8 = 75 |
| P9 = 108 | P10 = 127 (12 IN. $H_2O$) | P11 = 108 |
| P12 = 127 | | |

These values are assigned to the fuzzy parameters for the fuzzy water level monitor as defaults in FIG. 18 Box 904.

FIG. 20 describes the topology of the output for the fuzzy water level monitor. The output membership functions J1, J2, J3, J4 and J5 in FIG. 20 are respectively labeled VS (very small), S (small), M (medium), L (large), and VL (very large) in FIG. 20. The base lengths and centroid positions for the output membership functions are shown in the following TABLE V:

TABLE V

| OUTPUT: Water_Level (Gallons*8) | |
|---|---|
| B1 = 40 | C1 = 0 |
| B2 = 40 | C2 = 48 (6 gallons) |
| B3 = 40 | C3 = 96 (12 gallons) |
| B4 = 40 | C4 = 144 (18 gallons) |
| B5 = 40 | C5 = 192 (24 gallons) |

These values are also assigned to the fuzzy parameters for the fuzzy water level monitor as defaults in FIG. 18 Box 904.

The inferencing Rule Base for the fuzzy water level measurement system is as follows:
1. IF PRESSURE IS VERY SMALL (VS) THEN VOLUME IS VERY SMALL (VS).
2. IF PRESSURE IS SMALL (S) THEN VOLUME IS SMALL (S).
3. IF PRESSURE IS MEDIUM (M) THEN VOLUME IS MEDIUM (M).
4. IF PRESSURE IS LARGE (L) THEN VOLUME IS LARGE (L).
5. IF PRESSURE IS VERY LARGE (VL) THEN VOLUME IS VERY LARGE (VL).

The above inferencing rules for the water level monitor when coded in the format defined in Table II are as follows:

| RULES: | | | | | | | |
|---|---|---|---|---|---|---|---|
| 1. | 00100001 | 2. | 01000010 | 3. | 01100011 | 4. | 10000100 |
| 5. | 10100101 | 6. | 00000000 | 7. | 00000000 | 8. | 00000000 |
| 9. | 00000000 | 10. | 00000000 | 11. | 00000000 | 12. | 00000000 |
| 13. | 00000000 | 14. | 00000000 | 15. | 00000000 | | |

These values are also assigned to the fuzzy parameters for the fuzzy water level monitor as shown in block 904 of FIG. 18.

Execution proceeds to Box 906 to set Input1 equal to the value of water pressure sensed by the sensor 58. At Box 910 the FIG. 13 Fuzzy Routine called, which in turn at Box 802 calls the Calculate DOB routine of FIG. 14 which calculates the degree of belief for each membership function. The Inference Engine of FIG. 16 is called at Box 806, and the FIG. 17 defuzzification routine is called at Box 810 for each measured and filtered pressure reading. Next the controller calculates the degree of belief for each membership function by separate subroutine calls from the fuzzy water level monitor. All five of the Input1 membership functions are triangles (FIG. 19). The linear equations discussed hereinabove with reference to FIG. 19 are used to perform the actual degree of belief calculations.

The rule inferencing takes place after completing all the degree of belief calculations and storing them in a table. The initializations of the rule counter, the area summer, and the area and centroid product occur first. The inference engine loads the first rule (one byte) from the rule table. The definition for the rule format is in Table II hereinbelow. If the rule is equal to zero then no inferencing takes place and the inference engine loads the next rule from the rule table. With the occurrence of a valid rule, the membership function for the first input is decoded from the rule byte.

Referring to Table II, the three most significant bits, bits 7–5, determine the membership function for the first input. The degree of belief for this membership function is retrieved from the previously calculated degree of belief table. The process is repeated for the second input, decoding the correct membership functions from bits 4 and 3 of the rule byte. The minimum of the degree of belief for the membership function for the first input and the degree of belief for the membership function for the second input is determined and utilized to scale the output membership function as decoded from bits 2–0 of the rule byte. The area of this scaled output membership function is then calculated. This calculates the fuzzy output for a single rule; however, multiple rules are utilized in this fuzzy system. To combine the results of multiple rules, two summers are maintained. The first summer, the area summer, maintains a value representative of the area of the output membership functions resulting from the evaluation of the rules. The second summer, the centroid summer, maintains a value representative of the weighted centroids of the rules evaluated. The weighting factor is the area of the output membership function after the rule is evaluated. Once all rules are evaluated, defuzzification occurs by simply dividing the centroid summer by the area summer.

Specific Implementation of Dryer Air Temperature Control

The temperature control continuously monitors the air temperature as sensed by the FIG. 3 sensor 80 and sets the duty cycle of the electric heating elements 74 and 76. The air temperature error and the time rate of change of the air temperature error are used as inputs for the control. The air temperature error is defined as the measured air temperature minus the desired temperature. The desired temperature is programmable through the IR link. When the measured air temperature is above the desired temperature the error is positive and when the measure air temperature is below the desired temperature the error is negative. The second input, time rate of change of the air temperature error, is continuously calculated with a time base of 2 seconds. Each time through the control, the time rate of change of the air temperature error is equal to this air temperature error (t) minus the two second reading (t−2) temperature error divided by two.

More particularly, the sensor 80 comprises a thermistor mounted in the air flow to measure air temperature. The thermistor resistance changes with temperature from as high as 32.6 K ohms for 0° C. to 680 ohms for 100° C. A suitable voltage divider circuit produces an output voltage (Vo) approximately proportional to thermistor resistance. The output voltage (Vo) can be correlated to the air temperature with the following equation:

$$\text{Temp (°C.)} = 47 * Vo - 116.18$$

Figure 21:
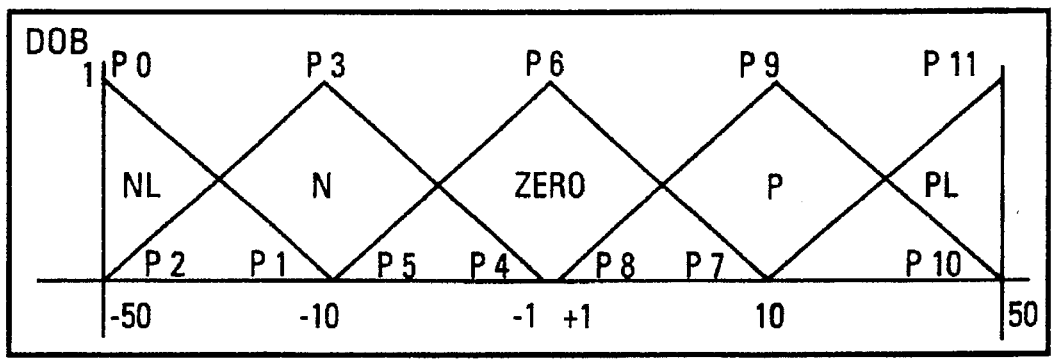
FIG. 21 is a plot of temperature error input membership functions specific to the clothes dryer application.

FIG. 21 describes the Input1 membership function (temperature error) topology for fuzzy temperature control. The membership functions F1, F2, F3, F4 and F5 of FIG. 9 in FIG. 21 are respectively labeled NL (negative large), N (negative), Zero (zero), P (positive), and PL (positive large). This gives the inferencing rules a descriptive representation.

| INPUT: TEMP_ERROR = MEASURED_TEMP − DESIRED_TEMP | | |
|---|---|---|
| P0 = −50 | P1 = −10 | P2 = −50 |
| P3 = −10 | P4 = −1 | P5 = 10 |
| P6 = 0 | P7 = 10 | P8 = 1 |
| P9 = 10 | P10 = 50 | P11 = 10 |
| P12 = 50 | | |

These values are also assigned to the fuzzy parameters for the fuzzy air temperature control as shown in Box 920 of FIG. 18.

Figure 22:
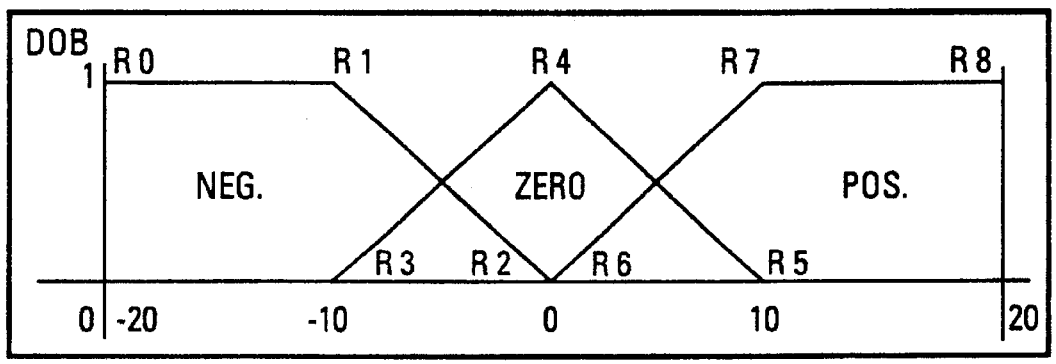
FIG. 22 is a plot of the second input membership functions, namely rate of change of temperature error, specific to the clothes dryer application.

FIG. 22 describes the Input2 membership function (time rate of change of temperature error) topology. The membership functions N1, N2 and N3 of FIG. 10 in FIG. 22 are respectively labeled Neg (negative), Zero (zero), and Pos (positive).

| INPUT2: RATE OF CHANGE OF TEMP_ERROR | | |
|---|---|---|
| R0 = −20 | R1 = −10 | R2 = 0 |
| R3 = −10 | R4 = 0 | R5 = 10 |
| R6 = 0 | R7 = 10 | R8 = 20 |

These values are assigned to the fuzzy parameters for the fuzzy air temperature control as shown in block 920 of FIG. 18.

Figure 23:
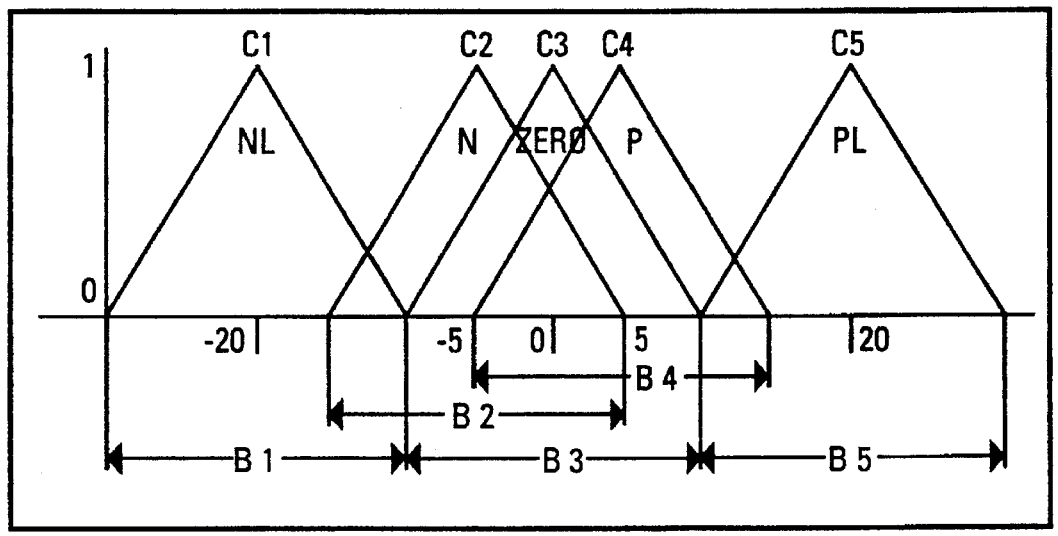
FIG. 23 is a plot of the output membership functions for the clothes dryer application, specifically, change in duty cycle.

FIG. 23 describes the Output membership function topology for the fuzzy temperature control. The membership functions J1, J2, J3, J4 and J5 of FIG. 11 in FIG. 23 are respectively labeled NL (negative large), N (negative), Zero (zero), P (positive), and PL (positive large).

| OUTPUT: CHANGE IN DUTY CYCLE | | |
|---|---|---|
| NL - - - Negative Large | B1 = 20 | C1 = −20 |
| N - - - Large | B2 = 20 | C2 = −5 |
| ZERO | B3 = 20 | C3 = 0 |
| P - - - Positive | B4 = 20 | C4 = 5 |
| LP - - - Positive Large | B5 = 20 | C5 = 20 |

These values are also assigned to the fuzzy parameters for the fuzzy air temperature control as shown in block 920 of FIG. 18.

The inferencing Rule Base for the fuzzy temperature control is as follows:

1. IF TEMP_ERROR IS NL AND TEMP_ERROR'S RATE OF CHANGE IS NEG.
   THEN DUTY_CYCLE_CHANGE IS PL (positive large).
2. IF TEMP_ERROR IS NL AND TEMP_ERROR'S RATE OF CHANGE IS ZERO
   THEN DUTY_CYCLE_CHANGE IS PL (positive large).
3. IF TEMP_ERROR IS NL AND TEMP_ERROR'S RATE OF CHANGE IS POS.
   THEN DUTY_CYCLE_CHANGE IS P (positive).
4. IF TEMP_ERROR IS N AND TEMP_ERROR'S RATE OF CHANGE IS NEG.
   THEN DUTY_CYCLE_CHANGE IS PL (positive large).

5. IF TEMP_ERROR IS N AND TEMP_ERROR'S RATE OF CHANGE IS ZERO
   THEN DUTY_CYCLE_CHANGE IS P (positive).
6. IF TEMP_ERROR IS N AND TEMP_ERROR'S RATE OF CHANGE IS POS.
   THEN DUTY_CYCLE_CHANGE IS ZERO.
7. IF TEMP_ERROR IS Z AND TEMP_ERROR'S RATE OF CHANGE IS NEG.
   THEN DUTY_CYCLE_CHANGE IS P (positive).
8. IF TEMP_ERRORS IS Z AND TEMP_ERROR'S RATE OF CHANGE IS ZERO
   THEN DUTY_CYCLE_CHANGE IS ZERO.
9. IF TEMP_ERROR IS Z AND TEMP_ERROR'S RATE OF CHANGE IS POS.
   THEN DUTY_CYCLE_CHANGE IS N (negative).
10. IF TEMP_ERROR IS P AND TEMP_ERROR'S RATE OF CHANGE IS NEG.
    THEN DUTY_CYCLE_CHANGE IS ZERO.
11. IF TEMP_ERROR IS P AND TEMP_ERROR'S RATE OF CHANGE IS ZERO
    THEN DUTY_CYCLE_CHANGE IS N (negative).
12. IF TEMP_ERROR IS P AND TEMP_ERROR'S RATE OF CHANGE IS POS.
    THEN DUTY_CYCLE_CHANGE IS NL (negative large).
13. IF TEMP_ERROR IS PL AND TEMP_ERROR'S RATE OF CHANGE IS NEG.
    THEN DUTY_CYCLE_CHANGE IS N (negative).
14. IF TEMP_ERROR IS PL AND TEMP_ERROR'S RATE OF CHANGE IS ZERO
    THEN DUTY_CYCLE_CHANGE IS NL (negative large).
15. IF TEMP_ERROR IS PL AND TEMP_ERROR'S RATE OF CHANGE IS POS.
    THEN DUTY_CYCLE_CHANGE IS NL (negative large).

Following is a listing of the above inferencing rules for the water level monitor in the format defined in Table II.

| RULES: | | | | | | | |
|---|---|---|---|---|---|---|---|
| 1. | 00101101 | 2. | 00110101 | 3. | 00111100 | 4. | 01001101 |
| 5. | 01010100 | 6. | 01011011 | 7. | 01101100 | 8. | 01110011 |
| 9. | 01111010 | 10. | 10001011 | 11. | 10010010 | 12. | 10011001 |
| 13. | 10101010 | 14. | 10110001 | 15. | 10111001 | | |

These values are assigned to the fuzzy parameters for the fuzzy air temperature controls shown in block 920 of flowchart 18.

Similarly, Boxes 920, 922, 924 and 926 of the FIG. 18 Fuzzy System routine utilize the temperature and change in temperature inputs. Very briefly, the degree of belief calculations, rule inferencing and defuzzification are performed for each pair of input values.

The controller calculates the degree of belief for each membership function by separate subroutine calls (Box 928). All five of the membership functions for Input1 are triangles (FIG. 21) and the three membership functions for Input2 are the shapes shown in FIG. 22. The linear equations presented hereinabove with reference to FIGS. 9 and 10 perform the actual degree of belief calculations. The rule inferencing takes place after completing all the degree of belief calculations and storing them in a table. The initializations of the rule counter, the area summer, and the area and centroid product occur first. The inference engine loads the first rule (one byte) from the rule table. The definition for the rule format is in Table II. If the rule is equal to zero then no inferencing takes place and the inference engine loads the next rule from the rule table. Again, with the occurrence of a valid rule, the membership function for the first input is decoded from the rule byte.

Referring to Table II, the three most significant bits, bits 7–5, determine the membership function for the first input. The degree of belief for this membership function is retrieved from the previously calculated degree of belief table. The process is repeated for the second input, decoding the correct membership functions from bits 4 and 3 of the rule byte. The minimum of the degree of belief for the membership function for the first input and the degree of belief for the membership function for the second input is determined and utilized to scale the output membership function as decoded from bits 2–0 of the rule byte. The area of this scaled output membership function is then calculated. This calculates the fuzzy output for a single rule; however, multiple rules are utilized in this fuzzy system. To combine the results of multiple rules, two summers are maintained. The first summer, the area summer, maintains a value representative of the area of the output membership functions resulting from the evaluation of the rules. The second summer, the centroid summer, maintains a value representative of the weighted centroids of the rules evaluated. The weighting factor is the area of the output membership function after the rule is evaluated. Once all rules are evaluated, defuzzification occurs by simply dividing the centroid summer by the area summer.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. An appliance electronic control system for controlling at least one appliance, said electronic control system comprising:

a controller including output lines for activating the functional elements within the appliance; memory elements for storing a plurality of parameters selected from the group consisting of washer soak time, washer time, washer spin time, washer spray rinse delay, washer spray rinse time, washer rinse time, washer final spin time, dryer total dry time, dryer standard cool time, and dryer extra cool time; and control elements for effecting an appliance operational cycle comprising a sequence of operational modes, the durations of at least some of the operational modes being determined based on parameters stored in said memory elements; and a communication link connected to said controller for inputting parameters to be stored in said memory elements.

2. An appliance electronic control system in accordance with claim 1, wherein said control elements are operable to store default parameters in said memory elements to use in the event no parameters are input via said communication link.

3. An appliance electronic control system in accordance with claim 1, which is selectively capable of controlling a plurality of appliances and wherein said control elements are capable of storing in said memory elements parameters appropriate to a particular appliance being controlled while ignoring parameters appropriate to other appliances.

4. An appliance electronic control system for controlling at least a washing machine appliance having a tub which is filled to a programmed water level during operation, said electronic control system comprising:

a controller including output lines for activating functional elements within the appliance, memory elements for storing parameters, and control elements for effecting an appliance operational cycle comprising a sequence of operational modes, the programmed water level being determined based on a water level parameter stored in said memory elements; and a communication link connected to said controller for inputting at least the water level parameter to be stored in said memory elements.

5. An appliance electronic control system for controlling at least a clothes drying machine appliance having a heating element which is operated so as to tend to maintain a programmed drying temperature during operation, said electronic control system comprising:

a controller including output lines for activating functional elements within the appliance, memory elements for storing parameters, and control elements for effecting an appliance operational cycle comprising a sequence of operational modes, the programmed drying temperature being determined based on a drying temperature parameter stored in said memory elements; and a communication link connected to said controller for inputting at least the drying temperature to be stored in said memory elements.

6. An appliance electronic control system in accordance with claim 5, wherein said control elements are selectively operable to effect an operational cycle for either a clothes drying machine or a washing machine having a tub which is filled to a programmed water level during operation, and wherein, in the case of a washing machine, the programmed water level is determined based on a water level parameter stored in said memory elements.

7. An appliance electronic control system in accordance with claim 1, wherein said controller includes further memory elements for storing allowable minimum and allowable maximum values for parameters input via said communication link; and wherein said controller includes means for comparing parameters input via said communication link to the allowable minimum and allowable maximum values, and storing the allowable minimum value as the parameter in the event the input parameter is below the allowable minimum value and storing the allowable maximum value as the parameter in the event the input parameter is above the allowable maximum value.

8. An appliance electronic control system in accordance with claim 1, which is for selectively controlling at least a washing machine appliance having a tub which is filed to a programmed water level during operation, the programmed water level being determined based on a water level parameter stored in said memory elements.

9. An appliance electronic control system in accordance with claim 8, wherein said control elements are selectively operable to effect an operational cycle for either said washing machine or a clothes drying machine appliance having a heating element which is operated so as to tend to maintain a programmed drying temperature during operation, the programmed drying temperature being determined based on a drying temperature parameter stored in said memory elements.

10. An appliance electronic control system in accordance with claim 1, which is for selectively controlling at least a clothes drying machine appliance having a heating element which is operated so as to tend to maintain a programmed drying temperature during operation, the programmed drying temperature being determined based on a drying temperature parameter stored in said memory elements.

11. An appliance electronic control system in accordance with claim 10, wherein said control elements are selectively operable to effect an operational cycle for either said clothes drying machine or a washing machine having a tub which is filled to a programmed water level during operation, and wherein, in the case of a washing machine, the programmed water level is determined based on a water level parameter stored in said memory elements.

* * * * *